(12) United States Patent
Zhang et al.

(10) Patent No.: US 12,105,262 B2
(45) Date of Patent: Oct. 1, 2024

(54) OPTICAL LENS ASSEMBLY AND ELECTRONIC DEVICE

(71) Applicant: NINGBO SUNNY AUTOMOTIVE OPTECH CO., LTD, Ningbo (CN)

(72) Inventors: Ludong Zhang, Ningbo (CN); Dongfang Wang, Ningbo (CN); Bo Yao, Ningbo (CN)

(73) Assignee: NINGBO SUNNY AUTOMOTIVE OPTECH CO., LTD, Ningbo (CN)

( * ) Notice: Subject to any disclaimer, the term of this patent is extended or adjusted under 35 U.S.C. 154(b) by 685 days.

(21) Appl. No.: 17/323,535

(22) Filed: May 18, 2021

(65) Prior Publication Data

US 2021/0364757 A1 Nov. 25, 2021

(30) Foreign Application Priority Data

May 20, 2020 (CN) .......................... 202010429590.5

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01)

(58) Field of Classification Search
CPC .... G02B 13/0045; G02B 9/60; G02B 13/004; G02B 13/006
See application file for complete search history.

(56) References Cited

U.S. PATENT DOCUMENTS

| | | | |
|---|---|---|---|
| 2004/0257677 A1 | 12/2004 | Matsusaka | |
| 2019/0041610 A1* | 2/2019 | Wu | ........................ G02B 13/18 |

FOREIGN PATENT DOCUMENTS

| | | | | |
|---|---|---|---|---|
| CN | 1424613 A | 6/2003 | | |
| CN | 202230238 U | * 5/2012 | ......... | G02B 13/0045 |
| CN | 102621671 A | 8/2012 | | |
| CN | 103376536 A | 10/2013 | | |
| CN | 203595856 U | 5/2014 | | |
| CN | 206515544 U | 9/2017 | | |
| CN | 206848557 U | 1/2018 | | |
| CN | 108663771 A | 10/2018 | | |
| CN | 108663772 A | 10/2018 | | |
| CN | 109324387 A | 2/2019 | | |
| JP | H1184234 A | 3/1999 | | |
| JP | 2001318314 A | 11/2001 | | |
| JP | 2010008562 A | 1/2010 | | |
| WO | WO-2016062230 A1 | * 4/2016 | ........... | G02B 13/002 |

* cited by examiner

*Primary Examiner* — Joseph P Martinez
*Assistant Examiner* — Ray Alexander Dean
(74) *Attorney, Agent, or Firm* — HAUPTMAN HAM, LLP

(57) ABSTRACT

The present disclosure discloses an optical lens assembly and an electronic device including the optical lens assembly. The optical lens assembly includes, sequentially from an object side to an image side along an optical axis, a first lens, a second lens, a third lens, a fourth lens and a fifth lens. The first lens has negative refractive power; the second lens has positive refractive power; the third lens has positive refractive power, and both of an object-side surface and an image-side surface of the third lens are convex; the fourth lens has negative refractive power, and both of an object-side surface and an image-side surface of the fourth lens are concave; and the fifth lens has refractive power. The optical lens assembly may achieve at least one of the beneficial effects of high resolution, miniaturization, small aperture, small CRA, and good temperature performance and the like.

20 Claims, 5 Drawing Sheets

OPTICAL LENS ASSEMBLY AND ELECTRONIC DEVICE

CROSS-REFERENCE TO RELATED APPLICATIONS

This application claims benefit of priority to Chinese Patent Application No. 202010429590.5 filed on May 20, 2020 before the China National Intellectual Property Administration, the entire disclosures of which is incorporated herein by reference in its entity.

TECHNICAL FIELD

The present disclosure relates to the field of optical elements, and specifically, relates to an optical lens assembly and an electronic device.

BACKGROUND

With the development and popularization of emerging technologies such as active driving or assisted driving, the market has more and more demand for on-board lens assemblies, especially for lens assemblies with high image quality under harsh environments. On the one hand, the industry has higher and higher requirements for the resolution of the lens assembly. On the other hand, with the improvement of equipment integration, the industry also requires the size of the lens assembly to be smaller and smaller. Ordinary small size lens assemblies have poor resolution. The traditional way to improve the resolution is to increase the number of lenses, but this will increase the cost and the size of the lens assembly, which is not conducive to the use of the lens assembly in a miniaturized integrated environment. Therefore, there is a need for an optical lens assembly that can simultaneously satisfy the resolution and the miniaturization.

SUMMARY

The present disclosure provides an optical lens assembly that is applicable to on-board installation and at least overcomes or partially overcomes at least one of the above deficiencies of the prior art.

In one aspect, the present disclosure provides an optical lens assembly which includes, sequentially from an object side to an image side along an optical axis, a first lens, a second lens, a third lens, a fourth lens and a fifth lens. The first lens has negative refractive power; the second lens has positive refractive power; the third lens has positive refractive power, an object-side surface thereof is convex, and an image-side surface thereof is convex; the fourth lens has negative refractive power, an object-side surface thereof is concave, and an image-side surface thereof is concave; and the fifth lens has refractive power.

In one embodiment, an object-side surface of the first lens is convex, and an image-side surface thereof is concave.

In one embodiment, an object-side surface of the first lens is concave, and an image-side surface thereof is convex.

In one embodiment, an object-side surface of the second lens is convex, and an image-side surface thereof is convex.

In one embodiment, an object-side surface of the second lens is concave, and an image-side surface thereof is convex.

In one embodiment, an object-side surface of the second lens is convex, and an image-side surface thereof is concave.

In one embodiment, an object-side surface of the fifth lens is convex, and an image-side surface thereof is concave.

In one embodiment, an object-side surface of the fifth lens is concave, and an image-side surface thereof is convex.

In one embodiment, an object-side surface of the fifth lens is convex, and an image-side surface thereof is convex.

In one embodiment, an object-side surface of the fifth lens is concave, and an image-side surface thereof is concave.

In one embodiment, the fifth lens has positive or negative refractive power.

In one embodiment, the third lens and the fourth lens are cemented to form a cemented lens.

In one embodiment, a stop is disposed between the first lens and the second lens.

In one embodiment, at least one of the first lens, the second lens and the fifth lens is aspheric.

In one embodiment, the first lens and the fifth lens are aspheric.

In one embodiment, each of the first to the fifth lenses in the optical lens assembly is made of glass material.

In one embodiment, a total length TTL of the optical lens assembly and a total effective focal length F of the optical lens assembly satisfy: $TTL/F \leq 4.5$.

In one embodiment, a distance SL from an object-side surface of the second lens to an imaging plane of the optical lens assembly and a total length TTL of the optical lens assembly satisfy: $0.6 \leq SL/TTL \leq 1.24$.

In one embodiment, a center thickness CT2 of the second lens along the optical axis and a distance T12 along the optical axis from an image-side surface of the first lens to an object-side surface of the second lens satisfy: $CT2/T12 \leq 1.5$.

In one embodiment, an effective focal length F2 of the second lens and a total effective focal length F of the optical lens assembly satisfy: $0.35 \leq F2/F \leq 1.75$.

In one embodiment, an effective focal length F4 of the fourth lens and an effective focal length F3 of the third lens satisfy: $|F4/F3| \leq 2.5$.

In one embodiment, a total effective focal length F of the optical lens assembly and a combined focal length F34 of the third lens and the fourth lens satisfy: $|F/F34| \leq 1.75$.

In one embodiment, a sum of the center thicknesses $\Sigma CT$ of all lenses in the optical lens assembly along the optical axis and a total length TTL of the optical lens satisfy: $\Sigma CT/TTL \leq 0.75$.

In one embodiment, an effective focal length F3 of the third lens and a total effective focal length F of the optical lens assembly satisfy: $0.1 \leq F3/F \leq 1.3$.

In one embodiment, a total length TTL of the optical lens assembly, an image height H corresponding to a maximum field-of-view of the optical lens assembly and the maximum field-of-view FOV of the optical lens assembly satisfy: $TTL/H/FOV \leq 0.30$.

In one embodiment, a maximum field-of-view FOV of the optical lens assembly, a total effective focal length F of the optical lens assembly and an image height H corresponding to the maximum field-of-view of the optical lens assembly satisfy: $(FOV*F)/H \leq 70$.

In one embodiment, a distance T23 along the optical axis from an image-side surface of the second lens to the object-side surface of the third lens and a total length TTL of the optical lens assembly satisfy: $T23/TTL \leq 0.07$.

In one embodiment, a total effective focal length F of the optical lens assembly and an image height H corresponding to a maximum field-of-view of the optical lens assembly satisfy: $F/H \geq 1.25$.

In one embodiment, a stop is disposed between the first lens and the second lens, and a distance DSR3 from the stop to an object-side surface of the second lens and a distance T12 along the optical axis from an image-side surface of the first lens to an object-side surface of the second lens satisfy: DSR3/T12≥0.37.

In one embodiment, a distance BFL from an image-side surface of the fifth lens to an imaging plane of the optical lens assembly and a distance TL from an object-side surface of the first lens to an image-side surface of the fifth lens satisfy: BFL/TL≥0.05.

In one embodiment, a refractive index Nd2 of the second lens satisfies: 1.5≤Nd2.

In one embodiment, a refractive index Nd3 of the third lens and a refractive index Nd4 of the fourth lens satisfy: Nd3/Nd4≤1.5.

In one embodiment, an Abbe number Vd4 of the fourth lens and an Abbe number Vd3 of the third lens satisfy: Vd4/Vd3≤1.1.

In one embodiment, a distance BFL from an image-side surface of the fifth lens to an imaging plane of the optical lens assembly and a total optical length TTL of the optical lens assembly satisfy: 0.02≤BFL/TTL≤0.27.

In one embodiment, a maximum field-of-view FOV of the optical lens assembly, a maximum effective aperture diameter D of an object-side surface of the first lens corresponding to the maximum field-of-view of the optical lens assembly and an image height H corresponding to the maximum field-of-view of the optical lens assembly satisfy: D/H/FOV≤0.06.

In one embodiment, an effective focal length F1 of the first lens and a total effective focal length F of the optical lens assembly satisfy: |F1/F|≥1.7.

In one embodiment, a center thickness dn of the n-th lens with the largest center thickness among the second lens to the fifth lens and a center thickness dm of the m-th lens with the smallest center thickness among the second lens to the fifth lens satisfy: dn/dm≤2.85, where both n and m are selected from 2, 3, 4, and 5.

In one embodiment, an effective focal length F1 of the first lens and an effective focal length F2 of the second lens satisfy: |F1/F2|≥1.8.

In one embodiment, a radius of curvature R4 of an object-side surface of the second lens and a radius of curvature R5 of an image-side surface of the second lens satisfy: |(R4−R5)/(R4+R5)|≤10.

In one embodiment, a radius of curvature R1 of an object-side surface of the first lens and a radius of curvature R2 of an image-side surface of the first lens satisfy: 0.3≤|R1/R2|≤2.

In one embodiment, a radius of curvature R9 of an object-side surface of the fifth lens and a radius of curvature R10 of an image-side surface of the fifth lens satisfy: 0.2≤|R9/R10|≤2.5.

In one embodiment, a distance T12 along the optical axis from an image-side surface of the first lens to an object-side surface of the second lens and a total length TTL of the optical lens assembly satisfy: 0.08≤T12/TTL≤0.5.

In another aspect, the present disclosure provides an optical lens assembly which includes, sequentially from an object side to an image side along an optical axis, a first lens, a second lens, a third lens, a fourth lens and a fifth lens. The first lens has negative refractive power; the second lens has positive refractive power; the third lens has positive refractive power; the fourth lens has negative refractive power; and the fifth lens has refractive power. A total length TTL of the optical lens assembly and a total effective focal length F of the optical lens assembly satisfy: TTL/F≤4.5.

In yet aspect, the present disclosure provides an electronic device, which may include an optical lens assembly according to the above-mentioned embodiment.

The present disclosure employs five lenses, and the optical lens assembly has at least one beneficial effect, such as small aperture, high resolution, miniaturization, low cost, small Chief Ray Angle (CRA), and good temperature performance and the like, by optimizing the refractive power and the surface shape of each lens and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
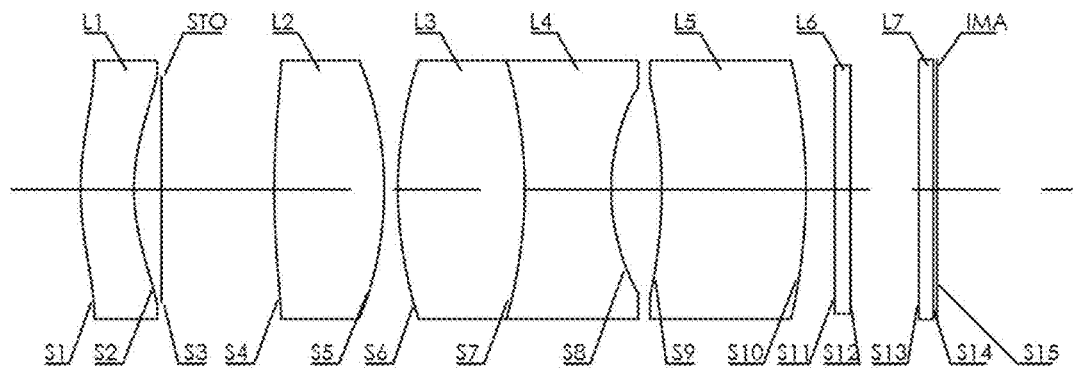
FIG. 1 illustrates a schematic structural view of an optical lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the image side is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens assembly according to an exemplary embodiment of the present disclosure includes, for example, five lenses having refractive power. The five lenses are a first lens, a second lens, a third lens, a fourth lens and a fifth lens, respectively. The five lenses are arranged sequentially from an object side to an image side along an optical axis.

In an exemplary embodiment, the optical lens assembly may further include a photosensitive element disposed on an imaging plane. Optionally, the photosensitive element disposed on the imaging plane may be a Charge-Coupled Device element (CCD) or a Complementary Metal-Oxide Semiconductor element (CMOS).

The first lens may have negative refractive power and a meniscus shape, and it may have a convex object-side surface and a concave image-side surface, or a concave object-side surface and a convex image-side surface. By configuring the refractive power and shape of the first lens, the incident angle of the incident light on the incident surface may be reduced, which is conducive to collecting more light into the optical system, thereby increasing the luminous flux and achieving higher image quality. The first lens having a meniscus shape towards the object may enable light to enter the rear optical system correctly and smoothly to improve resolution, and may collect light within a large field-of-view as much as possible to enter the rear optical system to increase luminous flux. In practical applications, considering the on-board lens assembly is installed outdoors, it may be in bad weather such as rain or snow. Such a shape is advantageous to the sliding of water droplets, and thus reduce the influence of the external environment on imaging. The first lens is preferably an aspheric lens to further improve the resolution quality. The first lens preferably has a concentric shape, which is beneficial to improve the resolution quality.

The second lens may have positive refractive power. The second lens may have a convex-convex shape, a concave-convex shape, or a convex-concave shape. The second lens having a convex-convex shape may compress the angle of the incident light to achieve a smooth transition of the light, which is beneficial to reduce the aperture of the lenses on the rear, so that the light may enter the rear optical system correctly and smoothly, thereby improving the resolution quality. The second lens may be disposed behind the stop, which is conducive to the convergence of incident light. At the same time, by constraining the proportional relationship between the effective focal length of the second lens and the total effective focal length of the optical lens assembly, such as F2/F≤27, the aperture and optical length of the optical lens assembly may be reduced, which is conducive to achieving the miniaturization of the optical lens assembly.

The third lens may have positive refractive power, an object-side surface thereof may be convex, and an image-side surface thereof may be convex. The third lens in the optical lens assembly provided by the present disclosure is a biconvex lens having positive refractive power, and both of the object-side surface and the image-side surface of the third lens are convex. The biconvex lens may compress the angle of incident light to achieve a smooth transition of light, which is beneficial to reduce the aperture of the lenses on the rear, so that the light may enter the rear optical system correctly and smoothly, thereby improving the resolution quality.

The fourth lens is a biconcave lens having negative refractive power, and both of an object-side surface and an image-side surface of the fourth lens are concave. In addition, the combination of the shape and refractive power of the third lens and the fourth lens may effectively converge the light incident from the front end and make the light smoothly transition to the fifth lens, which is beneficial to reduce the aperture of the lenses on the rear and increase the focal length of the lens assembly.

The fifth lens may have positive or negative refractive power. The fifth lens may have a convex-concave shape, a concave-convex shape, a convex-convex shape, or a concave-concave shape. By configuring the refractive power and shape of the fifth lens, it is beneficial to make the radii of curvature of the object-side surface and the image-side surface of the fifth lens close. Also, it is beneficial for the incident light to enter the imaging plane smoothly, thereby improving the resolution of the optical lens assembly. The fifth lens is preferably an aspheric lens, which may further improve the resolution. The fifth lens is preferably a concentric lens, which is beneficial to improve the resolution of the optical lens assembly. The fifth lens has a convex-concave shape or a concave-convex shape, which may correct the field curvature and astigmatic of the system and the high-order aberration of the large-angle field-of-view.

According to the embodiment of the present disclosure, a stop for limiting the light beam is disposed between the first lens and the second lens to further improve the image quality of the optical lens assembly. While the stop is disposed between the first lens and the second lens, it may effectively converge the light entering the optical system, and reduce the aperture of the lenses. In the embodiment of the present disclosure, the stop may be disposed near the image-side surface of the first lens. However, it should be noted that the location of the stop disclosed herein is merely exemplary and not restrictive. In alternative embodiments, the stop may be disposed at other positions according to actual requirements.

In an exemplary embodiment, as required, the optical lens assembly according to the present disclosure may further include an optical filter disposed between the fifth lens and an imaging plane to filter light having different wavelengths. Further, the optical lens assembly according to the present disclosure may further include a protective glass disposed between the optical filter and the imaging plane to prevent internal components (for example, a chip) of the optical lens assembly from being damaged.

As known to those skilled in the art, cemented lenses may be used to minimize or eliminate chromatic aberration. The use of cemented lens in an optical lens assembly may improve image quality and reduce the energy losses of light reflection, thereby improving the imaging sharpness of the lens assembly. In addition, the use of cemented lens may also simplify the assembly process in the manufacturing process of the lens assembly.

According to the embodiment of the present disclosure, the third lens and the fourth lens are cemented to form a cemented lens. The third lens having positive refractive power is in the front, and the fourth lens having negative refractive power is on the behind. Adopting the cementing method may have at least one of the following advantages: reducing the air interval between the two lenses to reduce the total length of the system; reducing the number of assembly parts between the third lens and the fourth lens to reduce the process and reduce the cost; reducing the tolerance sensitivity of the lens unit due to the tilt/eccentricity caused by the assembly process to improve the production yield; reducing light loss caused by reflection between the lenses to increase illuminance; and further reducing field curvature and effectively correcting the off-axis point aberration of the optical lens assembly. Such a cemented design shares the overall chromatic aberration correction of the system, effectively corrects the aberrations to improve the resolution, and makes the optical system compact to meet the requirements of miniaturization.

According to the embodiment of the present disclosure, a total length TTL of the optical lens assembly and a total effective focal length F of the optical lens assembly satisfy: $TTL/F \leq 4.5$, for example, $TTL/F \leq 4.0$, $TTL/F \leq 2.2$ or $TTL/F \leq 2.0$. By reasonably controlling the proportional relationship between the total length and the total effective focal length of the optical lens assembly, it is beneficial to ensure the miniaturization characteristics of the system. The total length TTL of the optical lens assembly refers to a distance along the optical axis from an object-side surface of the first lens to an imaging surface of the optical lens.

According to the embodiment of the present disclosure, a distance SL along the optical axis from an object-side surface of the second lens to an imaging plane of the optical lens assembly and a total length TTL of the optical lens assembly satisfy: $0.6 \leq SL/TTL \leq 1.24$, for example, $0.65 \leq SL/TTL \leq 1.22$, $0.66 \leq SL/TTL \leq 1.24$, or $0.68 \leq SL/TTL \leq 1.22$. In the optical lens assembly, by reasonably controlling the proportional relationship between the distance from the object-side surface of the second lens to the imaging plane of the optical lens assembly and the total length of the optical lens assembly, it is beneficial to correct distortion and coma of the system, thereby reducing tolerance sensitivity of the system.

According to the embodiment of the present disclosure, a center thickness CT2 of the second lens along the optical axis and a distance T12 along the optical axis from an image-side surface of the first lens to an object-side surface of the second lens satisfy: $CT2/T12 \leq 1.5$, for example, $CT2/T12 \leq 1.35$, $CT2/T12 \leq 1.26$, or $CT2/T12 \leq 1.22$. By reasonably distributing the interval between the lenses, it is beneficial to reduce the aperture of the lenses and the size of the lens assembly. Meanwhile, it may effectively reduce costs and achieve the miniaturization of the system while improving the system's resolution and overall brightness of the image.

According to the embodiment of the present disclosure, an effective focal length F2 of the second lens and a total effective focal length F of the optical lens assembly satisfy: $0.35 \leq F2/F \leq 1.75$, for example, $0.5 \leq F2/F \leq 1.5$, $0.6 \leq F2/F \leq 1$ or $F2/F \leq 27$. By reasonably distributing the proportional relationship between the effective focal length of the second lens and the total effective focal length of the optical lens assembly, the resolution of the system may be effectively improved, and the back focal drift of the optical lens assembly under high or low temperature environment may be reduced.

According to the embodiment of the present disclosure, an effective focal length F4 of the fourth lens and an effective focal length F3 of the third lens satisfy: $0.2 \leq |F3/F4| \leq 2.5$, for example, $0.4 \leq F3/F41 \leq 2.3$. By reasonably distributing the effective focal lengths of the third lens and the fourth lens, the chromatic aberration of the system may be corrected and the tolerance sensitivity of the lens assembly may be reduced. The third lens and the fourth lens of the cemented lens have similar focal lengths, which helps the light transition smoothly and corrects chromatic aberrations.

According to the embodiment of the present disclosure, an effective focal length F4 of the fourth lens and an effective focal length F3 of the third lens satisfy: $|F4/F3| \leq 2.5$, for example, $|F4/F3| \leq 2$ or $|F4/F3| \leq 1$. By reasonably distributing the effective focal lengths of the third lens and the fourth lens, the chromatic aberration of the system may be corrected and the tolerance sensitivity of the lens assembly may be reduced. By reasonably distributing the focal lengths of the fourth lens and the third lens of the cemented lens and controlling the ratio of the focal lengths within a reasonable range, it is beneficial to correct the chromatic aberration of the system and reduce the tolerance sensitivity of the lens assembly.

According to the embodiment of the present disclosure, a total effective focal length F of the optical lens assembly and a combined focal length F34 of the third lens and the fourth lens satisfy: |F/F34|≤1.75, for example, |F/F34|≤1.5 or |F/F34|≤0.95. By reasonably controlling the proportional relationship between the total effective focal length of the optical lens assembly and the combined focal length of the third lens and the fourth lens, it is beneficial to reduce the total length of the system and increase the focal length of the lens assembly. By reasonably distributing the effective focal length of the cemented lens, it is beneficial to achieve thermal compensation.

According to the embodiment of the present disclosure, a total effective focal length F of the optical lens assembly and a combined focal length F34 of the third lens and the fourth lens satisfy: |F34/F|≥0.5, for example, 0.8≤|F34/F|≤50. By reasonably controlling the proportional relationship between the total effective focal length of the optical lens assembly and the combined focal length of the third lens and the fourth lens, it is beneficial to reduce the total length of the system and increase the focal length of the lens assembly. By reasonably distributing the effective focal length of the cemented lens, it is beneficial to achieve thermal compensation.

According to the embodiment of the present disclosure, a sum of the center thicknesses ΣCT of all lenses in the optical lens assembly along the optical axis and a total length TTL of the optical lens satisfy: ΣCT/TTL≤0.75, for example, ΣCT/TTL≤0.7, ΣCT/TTL≤0.67 or ΣCT/TTL≤0.65. The center thickness of the lens refers to the distance along the optical axis from the object-side surface to the image-side surface of the lens. By reasonably setting the center thickness of each lens in the optical lens assembly, and controlling the ratio between the sum of the center thicknesses of all lenses and the total length of the optical lens assembly within a reasonable value range, it is beneficial to improve the effective utilization rate of the lens.

According to the embodiment of the present disclosure, an effective focal length F3 of the third lens and a total effective focal length F of the optical lens assembly satisfy: 0.1≤F3/F≤1.3, for example, 0.2≤F3/F≤1.2. By controlling the ratio of the effective focal length of the third lens to the total effective focal length of the optical lens assembly within a reasonable value range, it is beneficial to improve the resolution of the system and achieve the miniaturization of the optical lens assembly.

According to the embodiment of the present disclosure, a total length TTL of the optical lens assembly, an image height H corresponding to a maximum field-of-view of the optical lens assembly and the maximum field-of-view FOV of the optical lens assembly satisfy: TTL/H/FOV≤0.30, for example, TTL/H/FOV≤0.20. By reasonably setting the above-mentioned TTL, H and FOV, it is easy to achieve the miniaturization of the optical lens assembly.

According to the embodiment of the present disclosure, a maximum field-of-view FOV of the optical lens assembly, a total effective focal length F of the optical lens assembly and an image height H corresponding to the maximum field-of-view of the optical lens assembly satisfy: (FOV*F)/H≤70, for example, (FOV*F)/H≤65 or (FOV*F)/H≤60. By reasonably setting the above-mentioned FOV, F and H, it is easy to reduce the distortion of the system.

According to the embodiment of the present disclosure, a distance T23 along the optical axis from an image-side surface of the second lens to an object-side surface of the third lens and a total length TTL of the optical lens assembly satisfy: T23/TTL≤0.07, for example, T23/TTL≤0.06, T23/TTL≤0.01 or T23/TTL≤0.005. By reasonably controlling the proportional relationship between the distance along the optical axis from the image-side surface of the second lens to the object-side surface of the third lens and the total length of the optical lens assembly, it is beneficial to reduce the aperture of the lens and the size of the lens assembly, which may effectively reduce the cost and achieve the miniaturization of the system while improving the resolution of the system and the overall brightness of the image.

According to the embodiment of the present disclosure, a total effective focal length F of the optical lens assembly and an image height H corresponding to a maximum field-of-view of the optical lens assembly satisfy: F/H≥1.25, for example, F/H≥1.32, F/H≥1.5 or F/H≥1.6. By reasonably increasing the focal length of the lens, it is beneficial for the system to clearly image objects at distant.

According to the embodiment of the present disclosure, a distance DSR3 along the optical axis from a stop to an object-side surface of the second lens and a distance T12 along the optical axis from an image-side surface of the first lens to an object-side surface of the second lens satisfy: DSR3/T12≥0.37, for example, DSR3/T12≥0.4, DSR3/T12≥0.42, or DSR3/T12≥0.44. Reasonably setting the above-mentioned DSR3 and T12 is conducive to improving the system's resolution, and may easily achieve the miniaturization of the optical lens assembly.

According to the embodiment of the present disclosure, a distance BFL from an image-side surface of the fifth lens to an imaging plane of the optical lens assembly and a distance TL from an object-side surface of the first lens to an image-side surface of the fifth lens satisfy: BFL/TL≥0.05, for example, BFL/TL≥0.06, BFL/TL≥0.10, or BFL/TL≥0.12. By reasonably controlling the proportional relationship between the back focal length of the optical lens assembly and the length of the lens group of the optical lens assembly, it is conducive to the assembly of modules on the basis of achieving the miniaturization of the system. Herein, the back focal length of the optical lens assembly is BFL; the length of the lens group of the optical lens assembly is TL.

According to the embodiment of the present disclosure, a refractive index Nd2 of the second lens satisfies: 1.5≤Nd2, for example, 1.55≤Nd2. By reasonably setting the refractive index of the second lens, it is beneficial to reduce the aperture of the lens, improve the image quality, reduce the tolerance sensitivity of the system, improve production yield, and reduce production costs.

According to the embodiment of the present disclosure, a refractive index Nd3 of the third lens and a refractive index Nd4 of the fourth lens satisfy: Nd3/Nd4≤1.5, for example, Nd3/Nd4≤1.2. By reasonably setting the proportional relationship of the refractive indices of the third lens and the fourth lens in the cemented lens, it is beneficial to correct the chromatic aberration of the system, control the light direction, and reduce the aperture of the rear end of the lens assembly.

According to the embodiment of the present disclosure, an Abbe number Vd4 of the fourth lens and an Abbe number Vd3 of the third lens satisfy: Vd4/Vd3≤1.1, for example, Vd4/Vd3≤0.8. By reasonably setting the proportional relationship of the Abbe numbers of the fourth lens and the third lens in the cemented lens, it is beneficial to correct the axial chromatic aberration and the vertical chromatic aberration of the optical lens assembly, thereby improving the resolution quality.

According to the embodiment of the present disclosure, a distance BFL from an image-side surface of the fifth lens to an imaging plane of the optical lens assembly and a total optical length TTL of the optical lens assembly satisfy: $0.02 \leq BFL/TTL \leq 0.27$, for example, $0.035 \leq BFL/TTL \leq 0.25$, $0.02 \leq BFL/TTL \leq 0.25$, or $0.035 \leq BFL/TTL \leq 0.2$. By reasonably setting the proportional relationship between the optical back focus and the total optical length of the optical lens assembly, the optical back focus of the optical lens assembly may be made relatively long on the basis of achieving the miniaturization of the optical lens assembly, which may reduce the CAR and facilitate the assembly of the camera module.

According to the embodiment of the present disclosure, a maximum field-of-view FOV of the optical lens assembly, a maximum effective aperture diameter D of an object-side surface of the first lens corresponding to the maximum field-of-view of the optical lens assembly and an image height H corresponding to the maximum field-of-view of the optical lens assembly satisfy: $D/H/FOV \leq 0.06$, for example, $D/H/FOV \leq 0.04$. By reasonably setting the above-mentioned D, H, and FOV, it is easy to reduce the aperture of the front end of the optical lens assembly and achieve the miniaturization of the optical lens assembly.

According to the embodiment of the present disclosure, an effective focal length F1 of the first lens and a total effective focal length F of the optical lens assembly satisfy: $|F1/F| \geq 1.7$, for example, $|F1/F| \geq 2$, or $|F1/F| \geq 2.8$. By reasonably setting the proportional relationship between the effective focal length of the first lens and the total effective focal length of the optical lens assembly, more incident light can smoothly enter the optical system, thereby increasing the illuminance of the optical lens assembly.

According to the embodiment of the present disclosure, a center thickness dn of the n-th lens with the largest center thickness among the second lens to the fifth lens and a center thickness dm of the m-th lens with the smallest center thickness among the second lens to the fifth lens satisfy: $dn/dm \leq 2.85$, where both n and m are selected from 2, 3, 4, and 5. For example, $dn/dm \leq 2.8$, $dn/dm \leq 2.5$, or $dn/dm \leq 2.3$, where both n and m are selected from 2, 3, 4, and 5. By reasonably controlling the proportional relationship between the maximum center thickness and the minimum center thickness of the second lens to the fifth lens, the thickness of each lens may be made uniform and stable, which is conducive to keeping the optical lens assembly in good working condition at high or low temperature, ensuring that the incident light of the optical system changes little under working condition, and ensuring that the optical system has excellent temperature performance.

According to the embodiment of the present disclosure, an effective focal length F1 of the first lens and an effective focal length F2 of the second lens satisfy: $|F1/F2| \geq 1.8$. For example, $|F1/F2| \geq 2.2$. By reasonably setting the proportional relationship of the effective focal lengths of the first lens and the second lens, it is beneficial to concentrate the incident light, thereby improving the image quality of the optical system.

According to the embodiment of the present disclosure, a radius of curvature R4 of an object-side surface of the second lens and a radius of curvature R5 of an image-side surface of the second lens satisfy: $|(R4-R5)/(R4+R5)| \leq 10$. For example, $0.1 \leq |(R4-R5)/(R4+R5)| \leq 8.5$, $|(R4-R5)/(R4+R5)| \leq 5$, or $0.1 \leq |(R4-R5)/(R4+R5)| \leq 4$. By reasonably controlling the radii of curvature of the object-side surface and the image-side surface of the second lens, it is beneficial to limit the special shape of the second lens, correct the aberration of the optical system, and ensure that the light passing through the first lens smoothly transitions to the rear optical system through the second lens to reduce the tolerance sensitivity of the optical system.

According to the embodiment of the present disclosure, a radius of curvature R1 of an object-side surface of the first lens and a radius of curvature R2 of an image-side surface of the first lens satisfy: $0.3 \geq |R1/R2| \leq 2$, for example, $0.5 \leq |R1/R2| \leq 1.8$. By reasonably setting the proportional relationship of the radii of curvature of the object-side surface and the image-side surface of the first lens, the value of the radii of curvature of the object-side surface and the image-side surface of the first lens may be close, so that the incident light enters the optical system smoothly to improve the resolution of the optical lens assembly.

According to the embodiment of the present disclosure, a radius of curvature R9 of an object-side surface of the fifth lens and a radius of curvature R10 of an image-side surface of the fifth lens satisfy: $0.2 \leq |R9/R10| \leq 2.5$, for example, $0.25 \leq |R9/R10| \leq 2.2$, $0.2 \leq |R9/R10| \leq 2.2$, or $0.25 \leq |R9/R10| \leq 2$. By reasonably setting the proportional relationship of the radii of curvature of the object-side surface and the image-side surface of the fifth lens, the value of the radii of curvature of the object-side surface and the image-side surface of the fifth lens may be close, so that the incident light enters the imaging plane smoothly to improve the resolution of the optical lens assembly.

According to the embodiment of the present disclosure, a distance T12 along the optical axis from an image-side surface of the first lens to an object-side surface of the second lens and a total length TTL of the optical lens assembly satisfy: $0.08 \leq T12/TTL \leq 0.5$, for example, $0.11 \leq T12/TTL \leq 0.4$. By reasonably setting the proportional relationship between the distance along the optical axis from the image-side surface of the first lens to the object-side surface of the second lens and the total length of the optical lens assembly, it is possible to ensure that the interval between the first lens and the second lens is small to achieve the miniaturization of the optical lens assembly.

According to the embodiment of the present disclosure, at least one of the first lens, the second lens, and the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. For example, the first lens may be an aspheric lens to further improve the resolution quality. In addition, the first lens, the second lens, and the fifth lens may be aspheric lenses. By doing so, it is beneficial to correct the aberration of the system and improve the resolution.

According to the embodiment of the present disclosure, both of the first lens and the fifth lens may be aspheric. Both the first lens and the fifth lens are aspheric lenses to improve the resolution.

According to the embodiment of the present disclosure, each of the lenses in the optical lens assembly is made of glass material. Generally, since plastic lenses have a large thermal expansion coefficient, plastic lenses will have a relatively great impact on the overall performance of the lens assembly when the ambient temperature in which the lens assembly is located changes greatly. The use of glass lenses may reduce the impact on the optical back focus of the lens assembly caused by temperature. In addition, the use of glass lenses may ensure the stability of the optical performance at different temperatures. Of course, in applications with low temperature stability requirements, the first lens to the fifth lens in the optical lens assembly may also be made of plastic. Using plastics to make optical lenses may effectively reduce manufacturing costs.

According to the embodiment of the present disclosure, when the lens in the optical lens assembly is designed to be approximately concentric, or the object-side surface and the image-side surface of the lens tend to be flat, the lens tends to have no refractive power. The fifth lens in the optical lens assembly of the present disclosure may adopt this design method.

By optimally setting shape of the lens, reasonably distributing the refractive power and rationally selecting the lens material, the optical lens assembly according to the above embodiments of the present disclosure may achieve high resolution (above 8M) using a 5-piece structure. At the same time, the optical lens assembly may meet the requirements of miniaturization, low sensitivity, high production yield, and low cost. The optical lens assembly has a small CRA to avoid stray light caused by light emitted from the rear end of the lens and irradiated on the lens barrel, and to well match chip, such as on-board chip, without color cast and dark corners. The optical lens assembly has good temperature performance, small changes in imaging effects at high or low temperature, stable image quality, and can be applied to most environments where vehicles are used. Therefore, the optical lens assembly according to the above embodiments of the present disclosure may better meet the requirements of, for example, on-board applications.

However, it will be understood by those skilled in the art that the number of lenses constituting the lens assembly may be varied to achieve the various results and advantages described in this specification without departing from the technical solution claimed by the present disclosure. For example, although the embodiment is described by taking five lenses as an example, the optical lens assembly is not limited to include five lenses. The optical lens assembly may also include other numbers of lenses if desired.

Some specific examples of an optical lens assembly applicable to the above embodiment will be further described below with reference to the accompanying drawings.

Example 1

An optical lens assembly according to example 1 of the present disclosure is described below with reference to FIG. 1. FIG. 1 shows a schematic structural view of the optical lens assembly according to example 1 of the present disclosure.

As shown in FIG. 1, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having negative refractive power, an object-side surface S9 thereof is concave, and an image-side surface S10 thereof is convex. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S4 and the image-side surface S5 of the second lens L2 may be aspheric.

Optionally, the optical lens assembly may further include an optical filter L6 having an object-side surface S11 and an image-side surface S12 and a protective glass L7 having an object-side surface 13 and an image-side surface 14. The optical filter L6 may be used to correct color deviations, and the protective glass L7 may be used to protect an image sensor chip IMA located on an imaging plane S15. Light from an object sequentially passes through the respective surfaces S11 to S14 and is finally imaged on the imaging plane S15.

Table 1 shows the radius of curvature R, the thickness T (it should be understood that the thickness T in the row of S1 is the center thickness of the first lens L1, and the thickness T in the row of S2 is the air interval between the first lens L1 and the second lens L2, and so on), the refractive index Nd, and the Abbe number Vd of each lens of the optical lens assembly of example 1.

TABLE 1

| Surface number | Radius of curvature R (mm) | Thickness T (mm) | Refractive index Nd | Abbe number Vd |
| --- | --- | --- | --- | --- |
| S1 | 10.3487 | 1.8500 | 1.59 | 63.25 |
| S2 | 6.8457 | 0.9491 | | |
| ST0 | Infinite | 3.9173 | | |
| S4 | 29.6908 | 3.8175 | 1.69 | 63.41 |
| S5 | −12.2196 | 0.4809 | | |
| S6 | 14.4203 | 4.3873 | 1.57 | 57.51 |
| S7 | −16.1011 | 3.0115 | 1.50 | 25.89 |
| S8 | 7.3798 | 1.7424 | | |
| S9 | −17.2551 | 5.0013 | 1.70 | 27.25 |
| S10 | −19.8898 | 1.0000 | | |
| S11 | Infinite | 0.5500 | 1.52 | 64.21 |
| S12 | Infinite | 2.3764 | | |
| S13 | Infinite | 0.5000 | 1.52 | 64.21 |
| S14 | Infinite | 0.1250 | | |
| IMA | Infinite | | | |

The present example employs five lenses as an example. The lens assembly may have at least one beneficial effect, such as high resolution, miniaturization, small front-end aperture, small CRA, and good temperature performance and the like, by rationally configuring the refractive power, the surface shape, the center thickness of each lens, and the air interval between the lenses. The surface shape Z of each aspheric surface is defined by the following formula:

$$Z(h) = \frac{ch^2}{1 + \sqrt{1-(k+1)c^2h^2}} + Ah^4 + Bh^6 + Ch^8 + Dh^{10} + Eh^{12} \quad (1)$$

Where, Z is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; and A, B, C, D, E are high-order coefficients. Table 2 below shows the conic coefficient K and the high-order coefficients A, B, C, D and E applicable to aspheric surfaces S1, S2, S4 and S5 in example 1.

TABLE 2

| Surface number | K | A | B | C | D | E |
|---|---|---|---|---|---|---|
| S1 | 0.1476 | −1.1945E−03 | −1.629.3E−05 | 5.3488E−07 | −1.3831E−08 | 2.0354E−10 |
| S2 | 0.0325 | −1.6669E−03 | −2.3607E−05 | 9.5918E−07 | −2.6409E−08 | 3.0588E−10 |
| S4 | 0.3973 | −1.2124E−04 | −3.0830E−06 | −1.6891E−07 | 3.0946E−09 | −1.1695E−10 |
| S5 | 0.0179 | 1.9149E−05 | −1.7611E−06 | −5.9220E−08 | −5.9614E−10 | −1.4531E−11 |

Example 2

Figure 2:
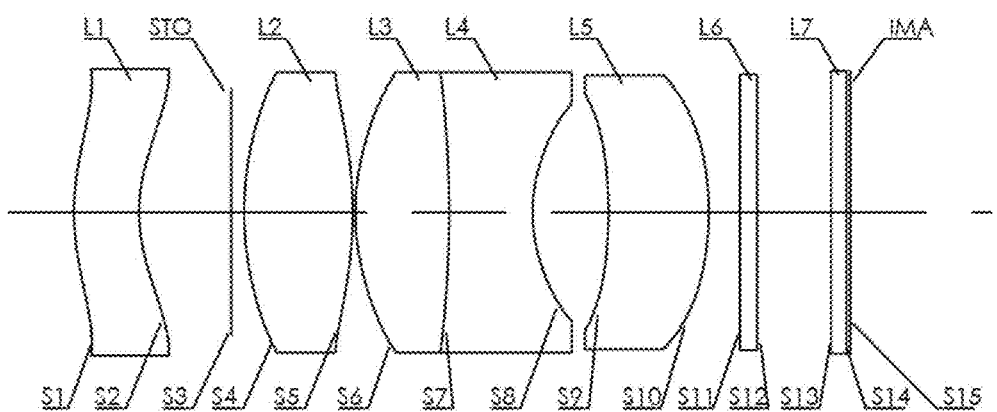
FIG. 2 illustrates a schematic structural view of an optical lens assembly according to example 2 of the present disclosure.

An optical lens assembly according to example 2 of the present disclosure is described below with reference to FIG. 2. In this example and the following examples, for the purpose of brevity, the description of parts similar to those in example 1 will be omitted. FIG. 2 shows a schematic structural view of the optical lens assembly according to example 2 of the present disclosure.

As shown in FIG. 2, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having positive refractive power, an object-side surface S9 thereof is concave, and an image-side surface S10 thereof is convex. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the object-side surface S4 of the second lens L2.

In this example, the object-side surface S1 and the image-side surface S2 of the first lens L1, the object-side surface S4 and the image-side surface S5 of the second lens L2 and the object-side surface S9 and the image-side surface S10 of the fifth lens L5 may be aspheric.

Optionally, the optical lens assembly may further include an optical filter L6 having an object-side surface S11 and an image-side surface S12 and a protective glass L7 having an object-side surface S13 and an image-side surface S14. The optical filter L6 may be used to correct color deviations, and the protective glass L7 may be used to protect an image sensor chip IMA located on an imaging plane S15. Light from an object sequentially passes through the respective surfaces S1 to S14 and is finally imaged on the imaging plane S15.

Table 3 shows the radius of curvature R, the thickness T, the refractive index Nd, and the Abbe number Vd of each lens of the optical lens assembly of example 2.

TABLE 3

| Surface number | Radius of curvature R (mm) | Thickness T (mm) | Refractive index Nd | Abbe number Vd |
|---|---|---|---|---|
| S1 | 8.0152 | 2.0876 | 1.63 | 57.56 |
| S2 | 5.2402 | 2.9660 | | |
| STO | Infinite | 0.4097 | | |
| S4 | 10.0321 | 3.4883 | 1.60 | 64.70 |
| S5 | −12.8979 | 0.1000 | | |
| S6 | 8.4685 | 2.9937 | 1.61 | 40.95 |
| S7 | −36.4575 | 2.6974 | 1.88 | 24.47 |
| S8 | 5.5332 | 2.4196 | | |
| S9 | −15.2924 | 3.2239 | 1.70 | 32.30 |
| S10 | −9.6869 | 1.0000 | | |
| S11 | Infinite | 0.5500 | 1.52 | 64.21 |
| S12 | Infinite | 2.3764 | | |
| S13 | Infinite | 0.5000 | 1.52 | 64.21 |
| S14 | Infinite | 0.1250 | | |
| IMA | Infinite | | | |

Table 4 below shows the conic coefficient K and the high-order coefficients A, B, C. D and E applicable to aspheric surfaces S1, S2, S4, S5, S9 and S10 in example 2.

TABLE 4

| Surface number | K | A | B | C | D | E |
|---|---|---|---|---|---|---|
| S1 | −0.1723 | −1.6573E−03 | −2.3491E−05 | 5.3021E−07 | −4.3832E−09 | 6.3671E−11 |
| S2 | −0.1911 | −3.0158E−03 | −3.4045E−05 | 1.3726E−06 | −1.7734E−08 | −3.5995E−10 |
| S4 | −42.3238 | 3.9503E−03 | −3.7269E−04 | 2.3639E−05 | −8.1263E−07 | 1.1885E−08 |
| S5 | 0.5336 | 4.2256E−04 | −1.2620E−06 | 1.1565E−06 | −7.0687E−08 | 2.2078E−09 |

TABLE 4-continued

| Surface number | K | A | B | C | D | E |
|---|---|---|---|---|---|---|
| S9 | 13.2218 | −4.6476E−04 | −1.4235E−05 | 3.6188E−06 | −5.1263E−07 | 2.7988E−08 |
| S10 | 2.6343 | −3.6322E−04 | −5.4850E−06 | 6.0978E−07 | −4.0848E−08 | 1.4371E−09 |

Example 3

Figure 3:
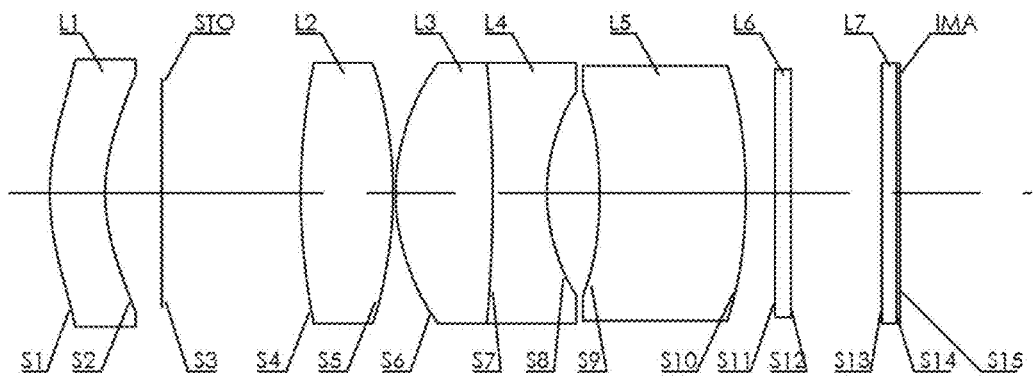
FIG. 3 illustrates a schematic structural view of an optical lens assembly according to example 3 of the present disclosure.

An optical lens assembly according to example 3 of the present disclosure is described below with reference to FIG. 3. FIG. 3 shows a schematic structural view of the optical lens assembly according to example 3 of the present disclosure.

As shown in FIG. 3, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having negative refractive power, an object-side surface S9 thereof is concave, and an image-side surface S10 thereof is convex. The third lens L3 and the fourth lens L4 may be cemented to form a cemented lens.

The optical lens assembly may further include a stop STO, and the stop STO may be disposed between the first lens L1 and the second lens L2 to improve the image quality.

For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 having an object-side surface S11 and an image-side surface S12 and a protective glass L7 having an object-side surface S13 and an image-side surface 14. The optical filter L6 may be used to correct color deviations, and the protective glass L7 may be used to protect an image sensor chip IMA located on an imaging plane S15. Light from an object sequentially passes through the respective surfaces S1 to S14 and is finally imaged on the imaging plane S15.

Table 5 shows the radius of curvature R, the thickness T, the refractive index Nd, and the Abbe number Vd of each lens of the optical lens assembly of example 3.

TABLE 5

| Surface number | Radius of curvature R (mm) | Thickness T (mm) | Refractive index Nd | Abbe number Vd |
|---|---|---|---|---|
| S1 | 8.3950 | 1.8958 | 1.59 | 55.41 |
| S2 | 6.3181 | 1.9445 | | |
| STO | Infinite | 4.7599 | | |
| S4 | 22.6107 | 3.1507 | 1.62 | 63.04 |
| S5 | −14.8456 | 0.1000 | | |
| S6 | 7.6717 | 3.3101 | 1.64 | 55.19 |
| S7 | −50.2952 | 1.8692 | 1.76 | 27.65 |
| S8 | 6.6928 | 1.7942 | | |
| S9 | −14.9853 | 5.0042 | 1.69 | 31.08 |
| S10 | −19.8862 | 1.0000 | | |
| S11 | Infinite | 0.5500 | 1.52 | 64.21 |
| S12 | Infinite | 3.1103 | | |
| S13 | Infinite | 0.5000 | 1.52 | 64.21 |
| S14 | Infinite | 0.1250 | | |
| IMA | Infinite | | | |

Table 6 below shows the conic coefficient K and the high-order coefficients A, B, C, D and E applicable to aspheric surfaces S1, S2, S9 and S10 in example 3.

TABLE 6

| Surface number | K | A | B | C | D | E |
|---|---|---|---|---|---|---|
| S1 | −0.1226 | −9.3075E−04 | −1.1729E−05 | 3.4568E−07 | −1.0454E−08 | 1.9249E−10 |
| S2 | −0.0250 | −1.4403E−03 | −1.9229E−05 | 8.6547E−07 | −3.5577E−08 | 6.1229E−10 |
| S9 | 1.1787 | −9.8037E−04 | 3.1404E−07 | −1.8226E−06 | 2.1966E−07 | −6.3914E−09 |
| S10 | −1.5195 | −5.4474E−04 | 4.1466E−06 | 7.5017E−08 | 1.3295E−08 | −3.7659E−10 |

Example 4

Figure 4:
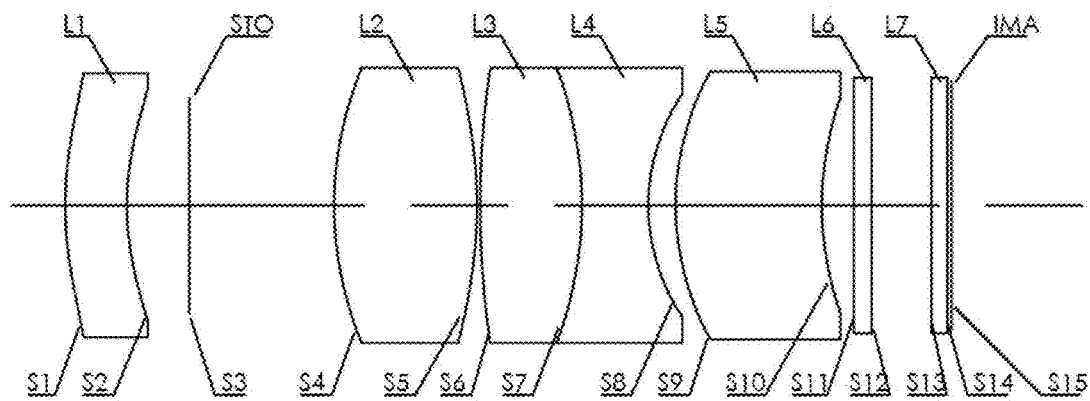
FIG. 4 illustrates a schematic structural view of an optical lens assembly according to example 4 of the present disclosure.

An optical lens assembly according to example 4 of the present disclosure is described below with reference to FIG. 4. FIG. 4 shows a schematic structural view of the optical lens assembly according to example 4 of the present disclosure.

As shown in FIG. 4, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having positive refractive power, an object-side surface S9 thereof is convex, and an image-side surface S10 thereof is concave. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S4 and the image-side surface S5 of the second lens L2 may be aspheric.

Optionally, the optical lens assembly may further include an optical filter L6 having an object-side surface S11 and an image-side surface S12 and a protective glass L7 having an object-side surface S13 and an image-side surface S14. The optical filter L6 may be used to correct color deviations, and the protective glass L7 may be used to protect an image sensor chip IMA located on an imaging plane S15. Light from an object sequentially passes through the respective surfaces S1 to S14 and is finally imaged on the imaging plane S15.

Table 7 shows the radius of curvature R, the thickness T, the refractive index Nd, and the Abbe number Vd of each lens of the optical lens assembly of example 4.

TABLE 7

| Surface number | Radius of curvature R (mm) | Thickness T (mm) | Refractive index Nd | Abbe number Vd |
|---|---|---|---|---|
| S1 | 11.1342 | 1.9323 | 1.55 | 57.53 |
| S2 | 8.5121 | 1.9601 | | |
| ST0 | Infinite | 4.5332 | | |
| S4 | 10.7852 | 4.4772 | 1.63 | 66.82 |
| S5 | −14.3149 | 0.1000 | | |
| S6 | 28.9920 | 3.1828 | 1.62 | 74.77 |
| S7 | −12.0265 | 2.0968 | 1.67 | 32.18 |
| S8 | 6.2599 | 0.8561 | | |
| S9 | 8.6319 | 4.5779 | 1.84 | 29.03 |
| S10 | 10.0612 | 1.0000 | | |
| S11 | Infinite | 0.5500 | 1.52 | 64.21 |
| S12 | Infinite | 1.8764 | | |
| S13 | Infinite | 0.5000 | 1.52 | 64.21 |
| S14 | Infinite | 0.1250 | | |
| IMA | Infinite | | | |

Table 8 below shows the conic coefficient K and the high-order coefficients A, B, C, D and E applicable to aspheric surfaces S1, S2, S4 and S5 in example 4.

TABLE 8

| Surface number | K | A | B | C | D | E |
|---|---|---|---|---|---|---|
| S1 | −8.3387 | 1.1188E−04 | −2.5878E−05 | 6.6601E−07 | −1.9024E−08 | 2.9249E−10 |
| S2 | −0.4497 | −7.2148E−04 | −9.4785E−06 | 2.4955E−07 | −1.0095E−08 | 2 2587E−10 |
| S4 | −0.0386 | −8.9677E−05 | 2.1440E−07 | −1.8017E−08 | 6.8690E−10 | −5.0780E−12 |
| S5 | −1.2610 | 1.6358E−04 | 4.7916E−08 | −1.2747E−08 | 7.1537E−I0 | −5.9593E−12 |

Example 5

Figure 5:
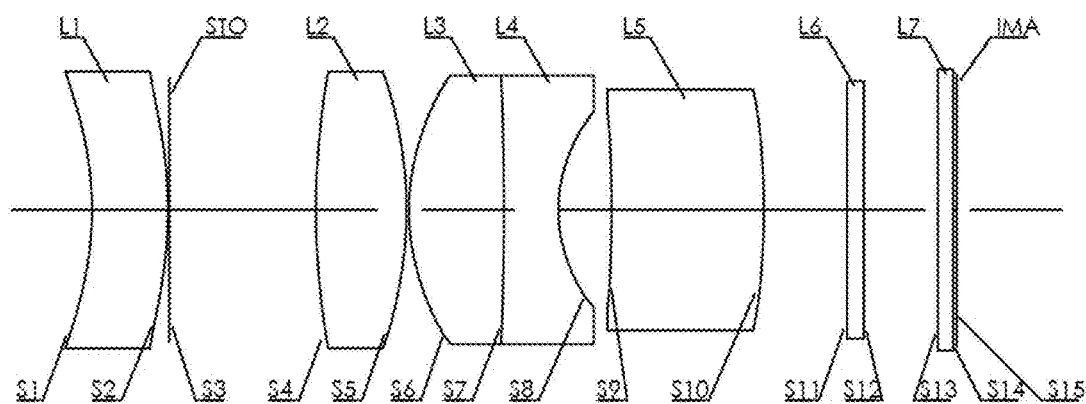
FIG. 5 illustrates a schematic structural view of an optical lens assembly according to example 5 of the present disclosure.

An optical lens assembly according to example 5 of the present disclosure is described below with reference to FIG. 5. FIG. 5 shows a schematic structural view of the optical lens assembly according to example 5 of the present disclosure.

As shown in FIG. 5, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is concave, and an image-side surface S2 thereof is convex. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having positive refractive power, an object-side surface S9 thereof is concave, and an image-side surface S10 thereof is convex. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 having an object-side surface S11 and an image-side surface S12 and a protective glass L7 having an object-side surface S13 and an image-side surface S14. The optical filter L6 may be used to correct color deviations, and the protective glass L7 may be used to protect an image sensor chip IMA located on an imaging plane S15. Light from an object sequentially passes through the respective surfaces S1 to S14 and is finally imaged on the imaging plane S15.

Table 9 shows the radius of curvature R, the thickness T, the refractive index Nd, and the Abbe number Vd of each lens of the optical lens assembly of example 5.

TABLE 9

| Surface number | Radius of curvature R (mm) | Thickness T (mm) | Refractive index Nd | Abbe number Vd |
|---|---|---|---|---|
| S1 | −10.9072 | 2.4962 | 1.59 | 61.17 |
| S2 | −13.8437 | 0.0365 | | |
| ST0 | Infinite | 4.8271 | | |
| S4 | 25.8416 | 2.9648 | 1.61 | 66.66 |
| S5 | −13.7344 | 0.1000 | | |
| S6 | 7.8967 | 3.1069 | 1.64 | 49.46 |
| S7 | −103.9180 | 1.7992 | 1.76 | 27.55 |
| S8 | 5.0453 | 1.7333 | | |
| S9 | −54.5695 | 5.0011 | 1.72 | 31.71 |
| S10 | −27.4251 | 2.7376 | | |
| S11 | Infinite | 0.5500 | 1.52 | 64.21 |
| S12 | Infinite | 2.0000 | | |
| S13 | Infinite | 0.5000 | 1.52 | 64.21 |
| S14 | Infinite | 0.5509 | | |
| IMA | Infinite | | | |

Table 10 below shows the conic coefficient K and the high-order coefficients A, B, C. D and E applicable to aspheric surfaces S1, S2, S9 and S10 in example 5.

TABLE 10

| Surface number | K | A | B | C | D | E |
|---|---|---|---|---|---|---|
| S1 | 0.0002 | 1.4619E−04 | 6.6430E−06 | −7.1023E−08 | 4.1090E−09 | −9.6544E−11 |
| S2 | −0.1099 | 2.5803E−04 | 6.6405E−06 | −1.0307E−07 | 6.7656E−09 | −1.1955E−10 |
| S9 | −86.5500 | −2.9169E−04 | 4.4067E−06 | −2.7553E−06 | 2.3171E−07 | −9.0968E−09 |
| S10 | −14.1873 | −2.0187E−04 | −7.3405E−06 | −1.5609E−07 | 9.2933E−09 | −3.5692E−10 |

Example 6

Figure 6:
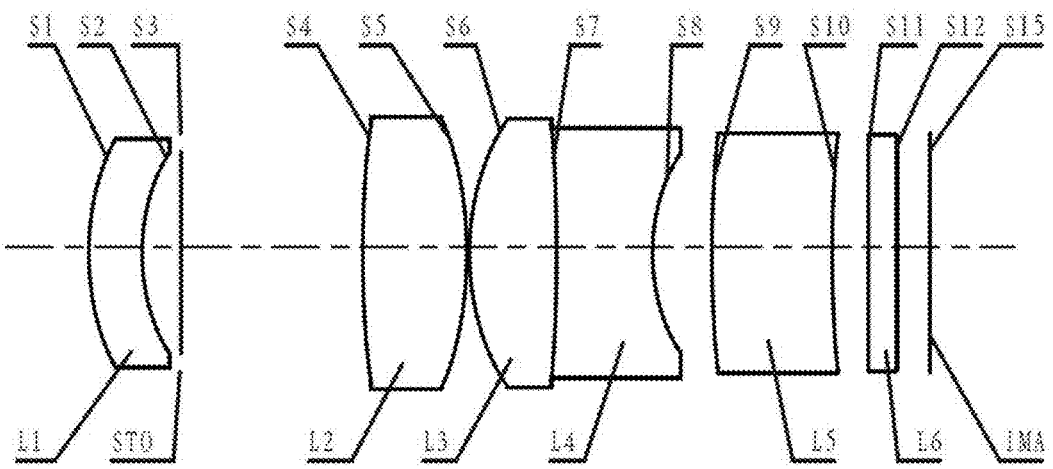
FIG. 6 illustrates a schematic structural view of an optical lens assembly according to example 6 of the present disclosure.

An optical lens assembly according to example 6 of the present disclosure is described below with reference to FIG. 6. FIG. 6 shows a schematic structural view of the optical lens assembly according to example 6 of the present disclosure.

As shown in FIG. 6, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having negative refractive power, an object-side surface S9 thereof is convex, and an image-side surface S10 thereof is concave. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 11 shows the radius of curvature R, the thickness T, the refractive index Nd, and the Abbe number Vd of each lens of the optical lens assembly of example 6.

TABLE 11

| Surface number | Radius of curvature R (mm) | Thickness T (mm) | Refractive index Nd | Abbe number Vd |
|---|---|---|---|---|
| S1 | 8.5151 | 2.0000 | 1.59 | 61.12 |
| S2 | 6.7016 | 1.4674 | | |
| ST0 | Infinite | 6.8140 | | |
| S4 | 38.6000 | 3.9000 | 1.62 | 63.41 |
| S5 | −13.8970 | 0.1000 | | |
| S6 | 9.5300 | 3.2700 | 1.62 | 63.41 |
| S7 | −57.6400 | 3.6000 | 1.73 | 28.31 |
| S8 | 7.2000 | 2.6144 | | |
| S9 | 47.3541 | 4.4900 | 1.68 | 31.08 |
| S10 | 37.8246 | 1.0000 | | |
| S11 | Infinite | 1.0500 | 1.52 | 64.21 |
| S12 | infinite | 1.2548 | | |
| IMA | Infinite | | | |

Table 12 below shows the conic coefficient K and the high-order coefficients A, B, C, D and E applicable to aspheric surfaces S1, S2, S9 and S10 in example 6.

TABLE 12

| Surface number | K | A | B | C | D | E |
|---|---|---|---|---|---|---|
| S1 | 1.009 | −5.525E−04 | −8.772E−06 | −1.071E−07 | −4.434E−09 | −3.056E−11 |
| S2 | 0.329 | −6.123E−04 | −1.503E−05 | −1.105E−07 | −1.837E−08 | 3.377E−10 |

TABLE 12-continued

| Surface number | K | A | B | C | D | E |
|---|---|---|---|---|---|---|
| S9 | 8.133 | −5.360E−04 | −1.696E−05 | 1.177E−06 | −8.280E−08 | 1.378E−09 |
| S10 | 20.075 | −7.785E−04 | −9.900E−06 | 5.759E−07 | −2.632E−08 | 5.456E−10 |

Example 7

Figure 7:
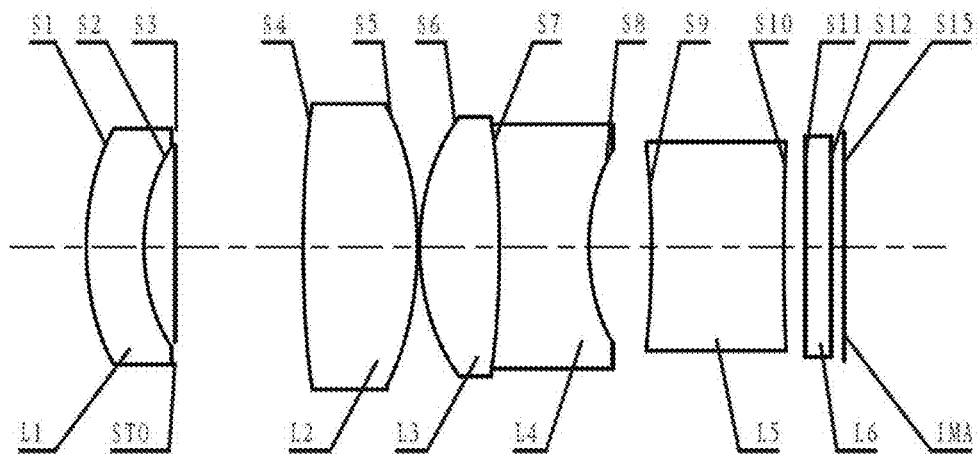
FIG. 7 illustrates a schematic structural view of an optical lens assembly according to example 7 of the present disclosure.

An optical lens assembly according to example 7 of the present disclosure is described below with reference to FIG. 7. FIG. 7 shows a schematic structural view of the optical lens assembly according to example 7 of the present disclosure.

As shown in FIG. 7, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a biconcave lens having negative refractive power, an object-side surface S9 thereof is concave, and an image-side surface S10 thereof is concave. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 13 shows the radius of curvature R, the thickness T, the refractive index Nd, and the Abbe number Vd of each lens of the optical lens assembly of example 7.

TABLE 13

| Surface number | Radius of curvature R (mm) | Thickness T (mm) | Refractive index Nd | Abbe number Vd |
|---|---|---|---|---|
| S1 | 8.8164 | 2.3276 | 1.53 | 60.47 |
| S2 | 6.8556 | 1.3133 | | |
| STO | Infinite | 5.1329 | | |
| S4 | 45.4639 | 4.6157 | 1.62 | 63.41 |
| S5 | −13.4185 | 0.1000 | | |
| S6 | 9.4441 | 3.2218 | 1.64 | 60.21 |
| S7 | −38.3398 | 3.6207 | 1.73 | 28.31 |
| S8 | 8.3610 | 2.5338 | | |
| S9 | −79.0868 | 5.3552 | 1.69 | 31.08 |
| S10 | 83.2104 | 0.8558 | | |
| S11 | Infinite | 1.0500 | 1.52 | 64.21 |
| S12 | Infinite | 0.5243 | | |
| IMA | Infinite | | | |

Table 14 below shows the conic coefficient K and the high-order coefficients A, B, C, D and E applicable to aspheric surfaces S1, S2, S9 and S10 in example 7.

TABLE 14

| Surface number | K | A | B | C | D | E |
|---|---|---|---|---|---|---|
| S1 | 0.977 | −6.034E−04 | −9.035E−06 | −7.674E−08 | −1.465E−09 | −5.151E−11 |
| S2 | 0.302 | −6.981E−04 | −1.309E−05 | 1.753E−08 | −1.438E−08 | 7.641E−11 |
| S9 | −36.000 | −5.213E−04 | −7.540E−06 | 1.559E−06 | −9.919E−08 | 2.828E−09 |
| S10 | 99.217 | −4.031E−04 | 1.231E−05 | 3.370E−07 | −1.390E−08 | 5.553E−10 |

Example 8

Figure 8:
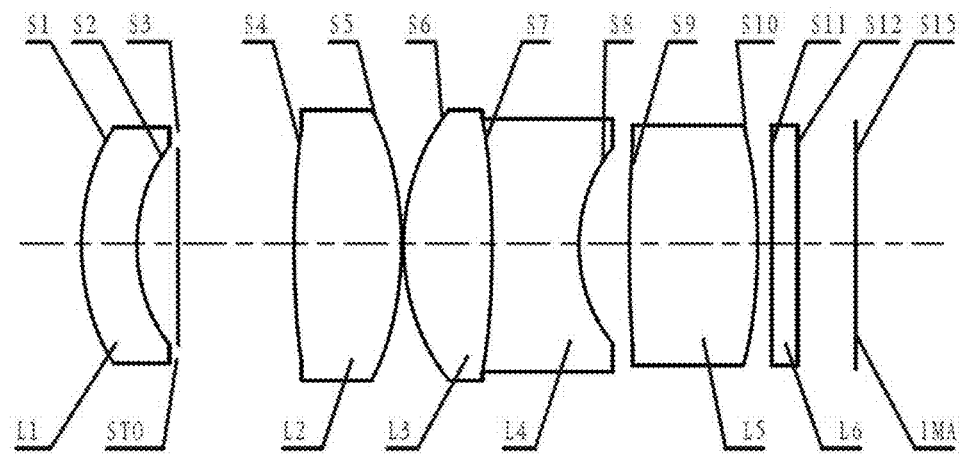
FIG. 8 illustrates a schematic structural view of an optical lens assembly according to example 8 of the present disclosure.

An optical lens assembly according to example 8 of the present disclosure is described below with reference to FIG. 8. FIG. 8 shows a schematic structural view of the optical lens assembly according to example 8 of the present disclosure.

As shown in FIG. 8, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a biconvex lens having positive refractive power, an object-side surface S9 thereof is convex, and an image-side surface S10 thereof is convex. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 15 shows the radius of curvature R, the thickness T, the refractive index Nd, and the Abbe number Vd of each lens of the optical lens assembly of example 8.

TABLE 15

| Surface number | Radius of curvature R (mm) | Thickness T (mm) | Refractive index Nd | Abbe number Vd |
|---|---|---|---|---|
| S1 | 7.7958 | 2.2704 | 1.53 | 60.47 |
| S2 | 5.9116 | 1.7467 | | |
| ST0 | Infinite | 4.7010 | | |
| S4 | 38.4573 | 4.3977 | 1.62 | 63.41 |
| S5 | −13.2139 | 0.0913 | | |
| S6 | 9.2253 | 3.6322 | 1.59 | 61.25 |
| S7 | −33.7254 | 3.5594 | 1.74 | 28.29 |
| S8 | 6.5423 | 2.3009 | | |
| S9 | 84.2092 | 5.0193 | 1.69 | 31.08 |
| S10 | −99.0279 | 0.5847 | | |
| S11 | Infinite | 1.0500 | 1.52 | 64.21 |
| S12 | Infinite | 2.3916 | | |
| IMA | Infinite | | | |

Table 16 below shows the conic coefficient K and the high-order coefficients A, B, C, D and E applicable to aspheric surfaces S1, S2, S9 and S10 in example 8.

TABLE 16

| Surface number | K | A | B | C | D | E |
|---|---|---|---|---|---|---|
| S1 | 0.776 | −6.638E−04 | −1.364E−05 | −1.370E−07 | 1.889E−09 | −2.214E−10 |
| S2 | 0.183 | −8.548E−04 | −2.273E−05 | −2.557E−07 | −1.674E−09 | −3.297E−10 |
| S9 | 41.137 | −4.531E−04 | −3.009E−05 | 3.328E−06 | −2.299E−07 | 5.240E−09 |
| S10 | −10.000 | −7.443E−04 | 7.032E−07 | −1.730E−07 | 1.228E−09 | 7.741E−11 |

Example 9

Figure 9:
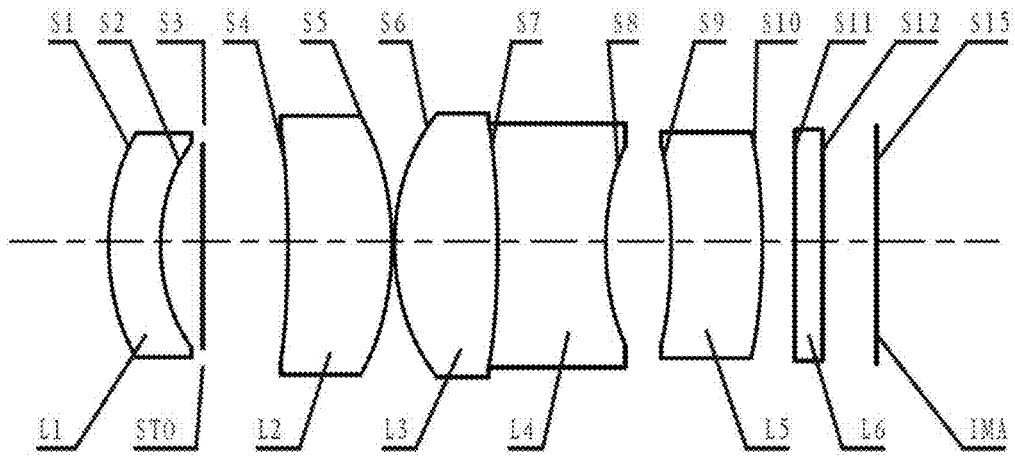
FIG. 9 illustrates a schematic structural view of an optical lens assembly according to example 9 of the present disclosure.

An optical lens assembly according to example 9 of the present disclosure is described below with reference to FIG. 9. FIG. 9 shows a schematic structural view of the optical lens assembly according to example 9 of the present disclosure.

As shown in FIG. 9, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a meniscus lens having positive refractive power, an object-side surface S4 thereof is concave, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having negative refractive power, an object-side surface S9 thereof is concave, and an image-side surface S10 thereof is convex. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 17 shows the radius of curvature R, the thickness T, the refractive index Nd, and the Abbe number Vd of each lens of the optical lens assembly of example 9.

TABLE 17

| Surface number | Radius of curvature R (mm) | Thickness T (mm) | Refractive index Nd | Abbe number Vd |
|---|---|---|---|---|
| S1 | 7.3163 | 1.9906 | 1.59 | 61.12 |
| S2 | 5.6801 | 1.6726 | | |
| ST0 | Infinite | 3.1925 | | |
| S4 | −36.9238 | 3.9760 | 1.62 | 63.88 |
| S5 | −10.8569 | 0.1000 | | |
| S6 | 8.6798 | 3.9462 | 1.62 | 63.41 |
| S7 | −31.8962 | 4.1326 | 1.73 | 28.31 |
| S8 | 10.0854 | 2.5036 | | |
| S9 | −49.5710 | 3.4796 | 1.65 | 33.84 |
| S10 | −71.2155 | 1.2460 | | |
| S11 | Infinite | 1.0500 | 1.52 | 64.21 |
| S12 | Infinite | 2.0724 | | |
| IMA | Infinite | | | |

Table 18 below shows the conic coefficient K and the high-order coefficients A, B, C, D and E applicable to aspheric surfaces S1, S2, S9 and S10 in example 9.

TABLE 18

| Surface number | K | A | B | C | D | E |
|---|---|---|---|---|---|---|
| S1 | 0.029 | −7.240E−04 | −1.089E−05 | −5.696E−07 | 2.501E−08 | −1.278E−10 |
| S2 | −0.178 | −1.063E−03 | −1.898E−05 | −1.086E−06 | 6.874E−08 | −1.543E−09 |
| S9 | 11.038 | −1.008E−03 | −5.391E−06 | 2.114E−07 | −3.314E−08 | 1.342E−09 |
| S10 | 16.782 | −1.160E−03 | 3.797E−05 | −2.725E−06 | 1.164E−07 | −1.727E−09 |

Example 10

Figure 10:
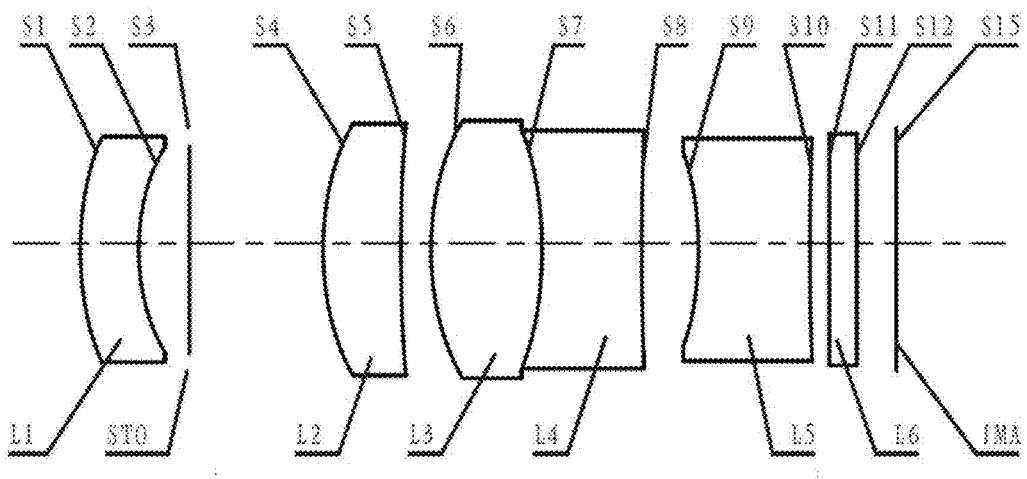
FIG. 10 illustrates a schematic structural view of an optical lens assembly according to example 10 of the present disclosure.

An optical lens assembly according to example 10 of the present disclosure is described below with reference to FIG. 10. FIG. 10 shows a schematic structural view of the optical lens assembly according to example 10 of the present disclosure.

As shown in FIG. 10, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a meniscus lens having positive refractive power, an object-side surface S4 thereof is convex, and an image-side surface S5 thereof is concave. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a biconcave lens having negative refractive power, an object-side surface S9 thereof is concave, and an image-side surface S10 thereof is concave. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 19 shows the radius of curvature R, the thickness T, the refractive index Nd, and the Abbe number Vd of each lens of the optical lens assembly of example 10.

TABLE 19

| Surface number | Radius of curvature R (mm) | Thickness T (mm) | Refractive index Nd | Abbe number Vd |
|---|---|---|---|---|
| S1 | 9.5243 | 2.2269 | 1.60 | 60.63 |
| S2 | 6.8709 | 2.0045 | | |
| ST0 | Infinite | 5.0315 | | |
| S4 | 10.6992 | 2.9685 | 1.62 | 63.41 |
| S5 | 59.6242 | 1.1480 | | |
| S6 | 10.5775 | 4.2370 | 1.62 | 63.88 |
| S7 | −13.6655 | 3.7994 | 1.73 | 28.31 |
| S8 | 99.9870 | 2.1659 | | |
| S9 | −27.4470 | 4.3991 | 1.69 | 31 08 |
| S10 | 50.4412 | 0.5941 | | |
| S11 | Infinite | 1.0500 | 1.52 | 64.21 |
| S12 | Infinite | 1.5084 | | |
| IMA | Infinite | | | |

Table 20 below shows the conic coefficient K and the high-order coefficients A, B, C, D and E applicable to aspheric surfaces S1, S2, S9 and S10 in example 10.

TABLE 20

| Surface number | K | A | B | C | D | E |
|---|---|---|---|---|---|---|
| S1 | 0.815 | −6.459E−04 | −5.056E−06 | −3.758E−09 | 2.225E−09 | −9.047E−11 |
| S2 | 0.149 | −9.153E−04 | −8.228E−06 | 1.335E−08 | 4.669E−09 | −3.130E−10 |

TABLE 20-continued

| Surface number | K | A | B | C | D | E |
|---|---|---|---|---|---|---|
| S9 | −4.667 | −1.885E−03 | −8.220E−06 | 1.750E−06 | −1.099E−07 | 3.997E−09 |
| S10 | −7.876 | −1.707E−04 | −7.270E−05 | 5.164E−06 | −1.965E−07 | 2.063E−09 |

Example 11

Figure 11:
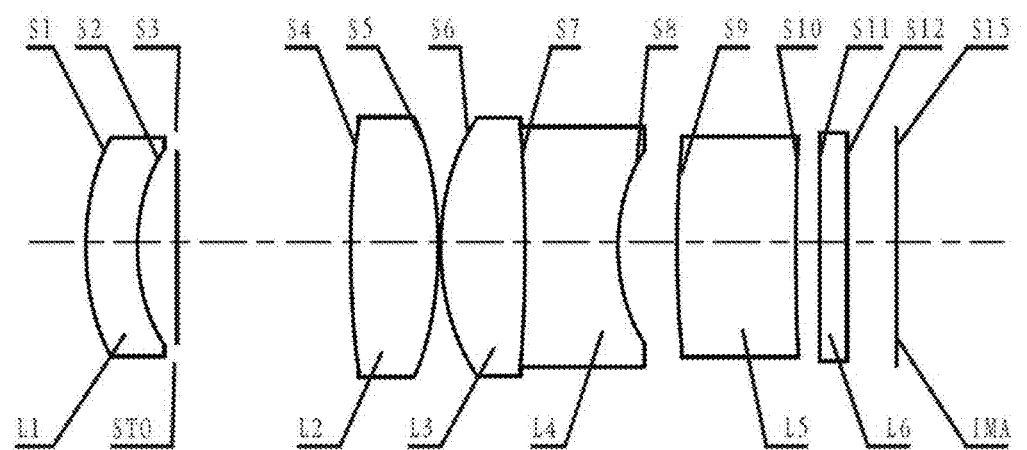
FIG. 11 illustrates a schematic structural view of an optical lens assembly according to example 11 of the present disclosure.

An optical lens assembly according to example 11 of the present disclosure is described below with reference to FIG. 11. FIG. 11 shows a schematic structural view of the optical lens assembly according to example 11 of the present disclosure.

As shown in FIG. 11, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having negative refractive power, an object-side surface S9 thereof is convex, and an image-side surface S10 thereof is concave. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 21 shows the radius of curvature R, the thickness T, the refractive index Nd, and the Abbe number Vd of each lens of the optical lens assembly of example 11.

TABLE 21

| Surface number | Radius of curvature R (mm) | Thickness T (mm) | Refractive index Nd | Abbe number Vd |
|---|---|---|---|---|
| S1 | 8.5151 | 2.0000 | 1.59 | 61.12 |
| S2 | 6.6702 | 1.4674 | | |
| ST0 | Infinite | 6.8140 | | |
| S4 | 37.1953 | 3.3900 | 1.62 | 63.41 |
| S5 | −14.2103 | 0.1000 | | |
| S6 | 9.5300 | 3.2700 | 1.62 | 63.41 |
| S7 | −60.0000 | 3.6110 | 1.73 | 28.31 |
| S8 | 7.3110 | 2.4898 | | |
| S9 | 55.3400 | 4.4120 | 1.69 | 31.08 |
| S10 | 39.0493 | 0.9335 | | |
| S11 | Infinite | 1.0500 | 1.52 | 64.21 |
| S12 | Infinite | 1.9287 | | |
| IMA | Infinite | | | |

Table 22 below shows the conic coefficient K and the high-order coefficients A, B, C, D and E applicable to aspheric surfaces S1, S2, S9 and S10 in example 11.

TABLE 22

| Surface number | K | A | B | C | D | E |
|---|---|---|---|---|---|---|
| S1 | 1.009 | −5.965E−04 | −8.283E−06 | −1.062E−07 | −4.229E−09 | −1.604E−11 |
| S2 | 0.326 | −6.704E−04 | −1.192E−05 | −9.022E−08 | −1.699E−08 | 3.355E−10 |
| S9 | 34.000 | −5.136E−04 | −1.800E−05 | 1.145E−06 | −8.131E−08 | 2.155E−09 |
| S10 | 71.000 | −5.990E−04 | −1.025E−05 | 5.818E−07 | −2.772E−08 | 4.048E−10 |

Example 12

Figure 12:
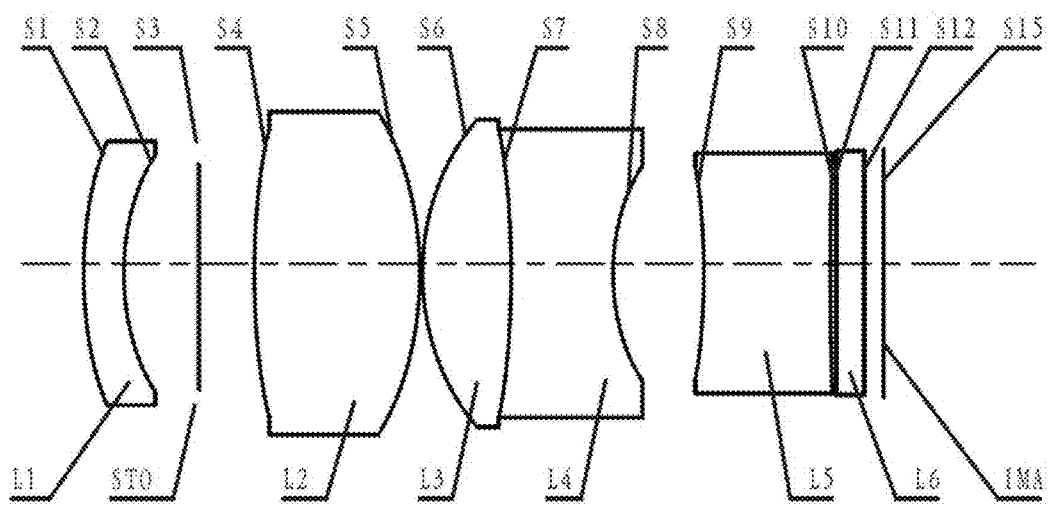
FIG. 12 illustrates a schematic structural view of an optical lens assembly according to example 12 of the present disclosure.

An optical lens assembly according to example 12 of the present disclosure is described below with reference to FIG. 12. FIG. 12 shows a schematic structural view of the optical lens assembly according to example 12 of the present disclosure.

As shown in FIG. 12, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a biconcave lens having negative refractive power, an object-side surface S9 thereof is concave, and an image-side surface S10 thereof is concave. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 23 shows the radius of curvature R, the thickness T, the refractive index Nd, and the Abbe number Vd of each lens of the optical lens assembly of example 12.

TABLE 23

| Surface number | Radius of curvature R (mm) | Thickness T (mm) | Refractive index Nd | Abbe number Vd |
| --- | --- | --- | --- | --- |
| S1 | 10.6874 | 1.5000 | 1.53 | 60.47 |
| S2 | 7.7869 | 2.8236 | | |
| STO | Infinite | 2.0548 | | |
| S4 | 26.2638 | 6.1836 | 1.62 | 63.41 |
| S5 | −12.4646 | 0.1000 | | |
| S6 | 9.1141 | 3.3128 | 1.64 | 60.21 |
| S7 | −31.6521 | 3.8128 | 1.73 | 28.31 |
| S8 | 7.9332 | 3.3882 | | |
| S9 | −94.0000 | 4.8304 | 1.69 | 31.08 |
| S10 | 72.0000 | 0.1163 | | |
| S11 | Infinite | 1.0500 | 1.52 | 64.21 |
| S12 | Infinite | 0.7214 | | |
| IMA | Infinite | | | |

Table 24 below shows the conic coefficient K and the high-order coefficients A, B, C, D and E applicable to aspheric surfaces S1, S2, S9 and S10 in example 12.

TABLE 24

| Surface number | K | A | B | C | D | E |
| --- | --- | --- | --- | --- | --- | --- |
| S1 | 1.186 | −5.961E−04 | −6.948E−06 | 3.877E−08 | 7.635E−10 | −4.415E−11 |
| S2 | 0.466 | −5.547E−04 | −9.850E−06 | 1.195E−07 | −3.651E−09 | −6.021E−11 |
| S9 | 83.460 | −5.608E−04 | −2.705E−05 | 8.370E−07 | −5.104E−08 | 9.224E−10 |
| S10 | 62.154 | −3.669E−04 | 1.984E−06 | −6.108E−07 | 7.590E−09 | 3.223E−10 |

Example 13

Figure 13:
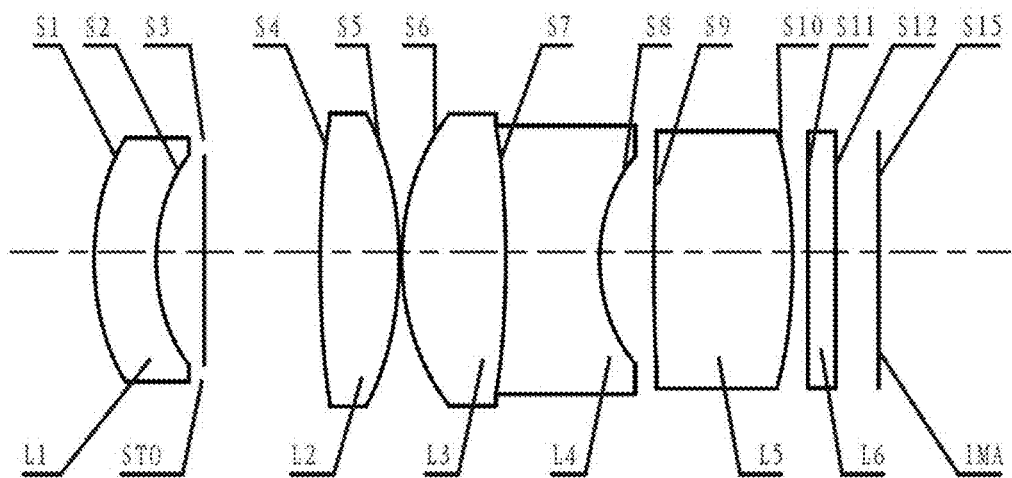
FIG. 13 illustrates a schematic structural view of an optical lens assembly according to example 13 of the present disclosure.

An optical lens assembly according to example 13 of the present disclosure is described below with reference to FIG. 13. FIG. 13 shows a schematic structural view of the optical lens assembly according to example 13 of the present disclosure.

As shown in FIG. 13, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a biconvex lens having positive refractive power, an object-side surface S4 thereof is convex, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a biconvex lens having positive refractive power, an object-side surface S9 thereof is convex, and an image-side surface S11 thereof is convex. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface 10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 25 shows the radius of curvature R, the thickness T, the refractive index Nd, and the Abbe number Vd of each lens of the optical lens assembly of example 13.

TABLE 25

| Surface number | Radius of curvature R (mm) | Thickness T (mm) | Refractive index Nd | Abbe number Vd |
| --- | --- | --- | --- | --- |
| S1 | 7.8543 | 2.3477 | 1.53 | 60.47 |
| S2 | 5.9486 | 1.8768 | | |

TABLE 25-continued

| Surface number | Radius of curvature R (mm) | Thickness T (mm) | Refractive index Nd | Abbe number Vd |
| --- | --- | --- | --- | --- |
| STO | Infinite | 4.3284 | | |
| S4 | 40.3726 | 2.9876 | 1.62 | 63.41 |
| S5 | −12.8365 | 0.1000 | | |
| S6 | 9.3882 | 3.9289 | 1.59 | 61.25 |

TABLE 25-continued

| Surface number | Radius of curvature R (mm) | Thickness T (mm) | Refractive index Nd | Abbe number Vd |
|---|---|---|---|---|
| S7 | −34.6819 | 3.5539 | 1.74 | 28.29 |
| S8 | 6.4194 | 2.3106 | | |
| S9 | 93.1278 | 4.9932 | 1.69 | 31.08 |
| S10 | −71.3614 | 0.5759 | | |
| S11 | Infinite | 1.0500 | 1.52 | 64.21 |
| S12 | Infinite | 1.6321 | | |
| IMA | Infinite | | | |

Table 26 below shows the conic coefficient K and the high-order coefficients A, B, C, D and E applicable to aspheric surfaces S1, S2, S9 and S10 in example 13.

TABLE 26

| Surface number | K | A | B | C | D | E |
|---|---|---|---|---|---|---|
| S1 | 0.770 | −6.680E−04 | −1.379E−05 | −1.398E−07 | 1.978E−09 | −2.577E−10 |
| S2 | 0.183 | −8.815E−04 | −2.417E−05 | −2.973E−07 | −1.952E−09 | −4.688E−10 |
| S9 | 74.000 | −3.081E−04 | −3.108E−05 | 3.371E−06 | −2.901E−07 | 4.934E−09 |
| S10 | 81.000 | −6.605E−04 | 5.536E−07 | −2.451E−07 | −8.397E−10 | 1.329E−10 |

Example 14

Figure 14:
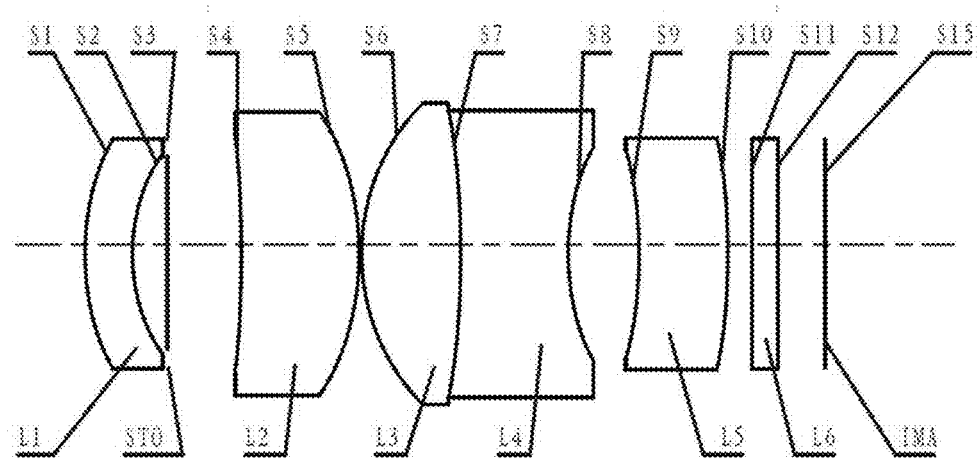
FIG. 14 illustrates a schematic structural view of an optical lens assembly according to example 14 of the present disclosure.

An optical lens assembly according to example 14 of the present disclosure is described below with reference to FIG. 14. FIG. 14 shows a schematic structural view of the optical lens assembly according to example 14 of the present disclosure.

As shown in FIG. 14, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 thereof is convex, and an image-side surface S2 thereof is concave. The second lens L2 is a meniscus lens having positive refractive power, an object-side surface S4 thereof is concave, and an image-side surface S5 thereof is convex. The third lens L3 is a biconvex lens having positive refractive power, an object-side surface S6 thereof is convex, and an image-side surface S7 thereof is convex. The fourth lens L4 is a biconcave lens having negative refractive power, an object-side surface S7 thereof is concave, and an image-side surface S8 thereof is concave. The fifth lens L5 is a meniscus lens having negative refractive power, an object-side surface S9 thereof is concave, and an image-side surface S10 thereof is convex. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 27 shows the radius of curvature R, the thickness T, the refractive index Nd, and the Abbe number Vd of each lens of the optical lens assembly of example 14.

TABLE 27

| Surface number | Radius of curvature R (mm) | Thickness T (mm) | Refractive index Nd | Abbe number Vd |
|---|---|---|---|---|
| S1 | 7.3994 | 1.9162 | 1.59 | 61.12 |
| S2 | 5.7740 | 1.3327 | | |
| ST0 | Infinite | 3.0594 | | |
| S4 | −45.7071 | 4.7544 | 1.62 | 63.88 |
| S5 | −11.1557 | 0.1000 | | |
| S6 | 8.8460 | 3.9974 | 1.62 | 63.41 |
| S7 | −34.7818 | 4.3431 | 1.73 | 28.31 |
| S8 | 9.7807 | 2.8527 | | |
| S9 | −53.6871 | 3.5863 | 1.65 | 33.84 |
| S10 | −131.2685 | 0.9689 | | |
| S11 | Infinite | 1.0500 | 1.52 | 64.21 |
| S12 | Infinite | 1.9052 | | |
| IMA | Infinite | | | |

Table 28 below shows the conic coefficient K and the high-order coefficients A, B, C, D and E applicable to aspheric surfaces S1, S2, S9 and S10 in example 14.

TABLE 28

| Surface number | K | A | B | C | D | E |
|---|---|---|---|---|---|---|
| S1 | 0.021 | −7.937E−04 | −1.022E−05 | −5.590E−07 | 2.308E−08 | −3.466E−10 |
| S2 | −0.173 | −1.073E−03 | −1.928E−05 | −1.090E−06 | 6.519E−08 | −1.342E−09 |

TABLE 28-continued

| Surface number | K | A | B | C | D | E |
|---|---|---|---|---|---|---|
| S9 | 92.000 | −9.882E−04 | −6.257E−06 | 3.487E−09 | −1.567E−08 | 1.397E−09 |
| S10 | 63.000 | −1.186E−03 | 3.027E−05 | −2.050E−06 | 1.102E−07 | −1.704E−09 |

Example 15

Figure 15:
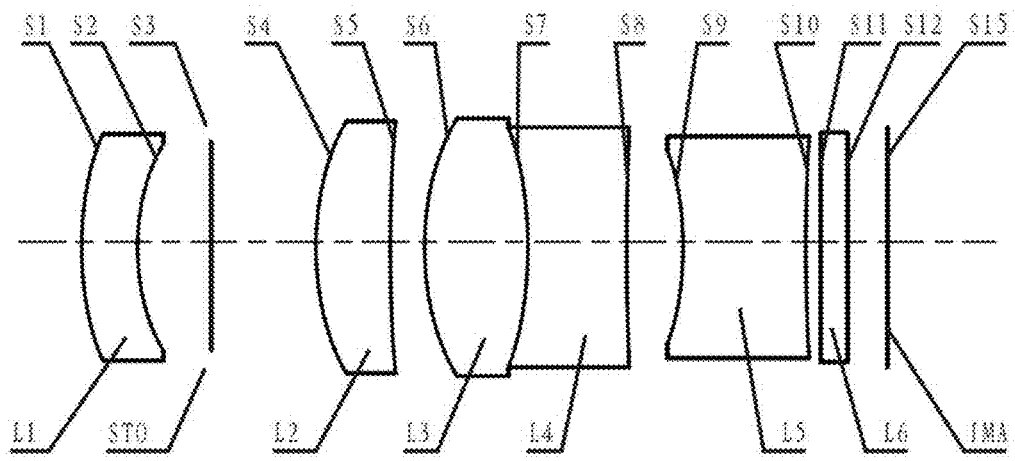
FIG. 15 illustrates a schematic structural view of an optical lens assembly according to example 15 of the present disclosure.

An optical lens assembly according to example 15 of the present disclosure is described below with reference to FIG. 15. FIG. 15 shows a schematic structural view of the optical lens assembly according to example 15 of the present disclosure.

As shown in FIG. 15, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S11 thereof is convex, and an image-side surface S2 thereof is concave. The second lens L2 is a meniscus lens having positive refractive power, an object-side surface S4 thereof is convex, and an image-side surface S5 thereof is concave. The third lens L3 is a biconvex lens having positive refractive power, an object-side surface S6 thereof is convex, and an image-side surface S7 thereof is convex-. The fourth lens L4 is a biconcave lens having negative refractive power, an object-side surface S7 thereof is concave, and an image-side surface S8 thereof is concave. The fifth lens L5 is a biconcave lens having negative refractive power, an object-side surface S9 thereof is concave, and an image-side surface S10 thereof is concave. The third lens L3 and the fourth lens L4 may be cemented to form a cemented lens.

The optical lens assembly may further include a stop STO, and the stop STO may be disposed between the first lens L1 and the second lens L2 to improve the image quality. For example, the stop STO may be disposed close to the image-side surface S2 of the first lens L1.

In this example, the object-side surface S1 and the image-side surface S2 of the first lens L1 and the object-side surface S9 and the image-side surface S10 of the fifth lens L5 may be aspheric.

Optionally, the optical lens assembly may further include an optical filter L6 and/or a protective lens L6' having an object-side surface S11 and an image-side surface S12. The optical filter L6 may be used to correct color deviations, and the protective lens L6' may be used to protect an image sensor chip located on an imaging plane S15. Light from an object sequentially passes through the respective surfaces S1 to S12 and is finally imaged on the imaging plane S15.

Table 29 shows the radius of curvature R, the thickness T, the refractive index Nd, and the Abbe number Vd of each lens of the optical lens assembly of example 15.

TABLE 29

| Surface number | Radius of curvature R (mm) | Thickness T (mm) | Refractive index Nd | Abbe number Vd |
|---|---|---|---|---|
| S1 | 9.7194 | 2.1629 | 1.60 | 60.63 |
| S2 | 6.9792 | 2.8985 | | |
| STO | Infinite | 4.0139 | | |
| S4 | 10.6907 | 2.8794 | 1.62 | 63.41 |
| S5 | 57.9895 | 1.3246 | | |
| S6 | 10.4606 | 4.0000 | 1.62 | 63.88 |
| S7 | −14.5603 | 3.8277 | 1.73 | 28.31 |
| S8 | 93.2907 | 2.1854 | | |
| S9 | −27.3150 | 4.7564 | 1.69 | 31.08 |
| S10 | 15.6972 | 0.5665 | | |
| S11 | Infinite | 1.0500 | 1.52 | 64.21 |
| S12 | Infinite | 1.5452 | | |
| IMA | Infinite | | | |

Table 30 below shows the conic coefficient K and the high-order coefficients A, B, C, D and E applicable to aspheric surfaces S1, S2, S9 and S10 in example 15.

TABLE 30

| Surface number | K | A | B | C | D | E |
|---|---|---|---|---|---|---|
| S1 | 0.789 | −6.707E−04 | −4.672E−06 | 4.026E−09 | 2.363E−09 | −9.123E−11 |
| S2 | 0.157 | −9.372E−04 | −8.702E−06 | 3.886E−08 | 4.781E−09 | −3.730E−10 |
| S9 | −34.500 | −1.922E−03 | −1.810E−05 | 1.429E−06 | −1.064E−07 | 3.891E−09 |
| S10 | −94.600 | −2.684E−04 | −6.252E−05 | 4.908E−06 | −1.734E−07 | 2.805E−09 |

In view of the above, examples 1 to 15 respectively satisfy the relationship shown in the following Table 31-1. Table 31-2 and Table 31-3. In Table 31-1, Table 31-2 and Table 31-3, the units of SL, TTL, BFL, TL, D, H, F1 to F5, F, F34, ΣCT are millimeter (mm), and the unit of FOV is degree (°).

TABLE 31-1

| Conditional/Example | Example 1 | Example 2 | Example 3 | Example 4 | Example 5 |
|---|---|---|---|---|---|
| SL | 22.9923 | 19.4742 | 20.5137 | 19.3421 | 21.0438 |
| TTL | 29.7086 | 24.9374 | 29.1204 | 27.7677 | 28.4036 |
| BFL | 3.5514 | 3.5514 | 4.2553 | 4.0514 | 6.3385 |
| TL | 26.1573 | 21.3861 | 24.8351 | 23.7163 | 22.0650 |
| D | 9.0000 | 9.2000 | 9.2200 | 8.2593 | 9.1084 |
| H | 9.0020 | 9.0020 | 9.0020 | 7.7860 | 8.9320 |
| FOV | 31.2000 | 31.2000 | 31.2000 | 31.2000 | 31.2000 |
| F1 | −42.4760 | −33.8979 | −65.3604 | −88.4287 | −127.1772 |
| F2 | 12.9379 | 10.0130 | 14.9330 | 10.3878 | 15.0070 |
| F | 16.4190 | 16.0490 | 16.6324 | 14.0183 | 16.0040 |
| F3 | 14.0058 | 11.5105 | 10.6212 | 14.1851 | 11.5713 |
| F4 | −9.6956 | −5.2697 | −7.6535 | −5.8111 | −6.2782 |
| F34 | −94.4358 | −17.3849 | −320.2005 | −11.7866 | −28.5232 |

TABLE 31-1-continued

| Conditional/Example | Example 1 | Example 2 | Example 3 | Example 4 | Example 5 |
|---|---|---|---|---|---|
| ΣCT | 18.0676 | 14.4908 | 15.2300 | 16.2670 | 15.3681 |
| SL/TTL | 0.7739 | 0.7809 | 0.7044 | 0.6966 | 0.7409 |
| CT2/T12 | 0.7845 | 1.0334 | 0.4699 | 0.6895 | 0.6096 |
| F2/F | 0.7880 | 0.6239 | 0.8978 | 0.7410 | 0.9377 |
| Nd3/Nd4 | 1.0484 | 0.8555 | 0.9335 | 0.9645 | 0.9335 |
| Vd4/Vd3 | 0.4503 | 0.5975 | 0.5009 | 0.4304 | 0.5570 |
| |F4/F3| | 0.6923 | 0.4578 | 0.7206 | 0.6519 | 0.6661 |
| |F/F34| | 0.1739 | 0.9232 | 0.0519 | 1.1893 | 0.5611 |
| ΣCT/TTL | 0.6082 | 0.5811 | 0.5230 | 0.5858 | 0.5411 |
| TTL/F | 1.8094 | 1.5538 | 1.7508 | 1.9808 | 1.7748 |
| F3/F | 0.8530 | 0.7172 | 0.6386 | 1.0119 | 0.7230 |
| TTL/H/FOV | 0.0976 | 0.1012 | 0.0918 | 0.1047 | 0.1068 |
| BFL/TL | 0.1358 | 0.1661 | 0.1713 | 0.1708 | 0.2873 |
| (FOV*F)/H | 56.9065 | 55.6242 | 57.6462 | 56.1739 | 55.9030 |
| T23/TTL | 0.0162 | 0.0040 | 0.0034 | 0.0036 | 0.0035 |
| F/H | 1.8239 | 1.7828 | 1.8476 | 1.8004 | 1.7918 |
| DSR3/T12 | 0.8050 | 0.1214 | 0.7100 | 0.6981 | 0.9925 |
| D/H/FOV | 0.0320 | 0.0328 | 0.0328 | 0.0340 | 0.0327 |
| |F1/F| | 2.5870 | 2.1121 | 3.9297 | 6.3081 | 7.9466 |
| |(R4 − R5)/(R4 + R5)| | 2.3988 | 8.0013 | 4.8237 | 7.1111 | 3.2688 |
| dn/dm | 1.6607 | 1.2932 | 2.6772 | 2.1833 | 2.7796 |
| |F1/F2| | 3.2831 | 3.3854 | 4.3769 | 8.5128 | 8.4745 |
| |R1/R2| | 1.5117 | 1.5296 | 1.3287 | 1.3080 | 0.7879 |
| |R9/R10| | 0.8675 | 1.5787 | 0.7536 | 0.8579 | 1.9898 |
| T12/TTL | 0.1638 | 0.1354 | 0.2302 | 0.2338 | 0.1712 |
| BFL/TTL | 0.1195 | 0.1424 | 0.1461 | 0.1459 | 0.2232 |

TABLE 31-2

| Conditional/Example | Example 6 | Example 7 | Example 8 | Example 9 | Example 10 |
|---|---|---|---|---|---|
| SL | 21.2792 | 21.8773 | 23.0269 | 22.5065 | 21.8704 |
| TTL | 31.5607 | 30.6511 | 31.7451 | 29.3622 | 31.1333 |
| BFL | 3.3048 | 2.4301 | 4.0263 | 4.3684 | 3.1525 |
| TL | 28.2558 | 28.2210 | 27.7188 | 24.9938 | 27.9808 |
| D | 8.7284 | 9.5404 | 9.7139 | 8.6000 | 8.6000 |
| H | 8.9380 | 9.1420 | 9.7980 | 9.0440 | 8.7880 |
| FOV | 32.2000 | 32.2000 | 32.2000 | 32.2000 | 32.2000 |
| F1 | −90.4595 | −98.5662 | −79.0466 | −78.6057 | −59.6118 |
| F2 | 16.9610 | 17.2252 | 16.3943 | 23.3219 | 20.5506 |
| F | 16.5762 | 15.9306 | 17.9628 | 16.8176 | 14.9980 |
| F3 | 13.4388 | 12.1175 | 12.6505 | 11.4289 | 10.2596 |
| F4 | −8.5235 | −9.0585 | −7.0823 | −10.0262 | −16.1578 |
| F5 | −335.7758 | −57.6792 | 66.3563 | −267.2012 | −25.0470 |
| F34 | −85.0518 | 504.0869 | −43.2418 | 49.2902 | 21.4300 |
| ΣCT | 17.2600 | 19.1410 | 18.8789 | 17.5250 | 17.6308 |
| SL/TTL | 0.6742 | 0.7138 | 0.7254 | 0.7665 | 0.7025 |
| CT2/T12 | 0.4709 | 0.7160 | 0.6821 | 0.8172 | 0.4219 |
| F2/F | 1.0232 | 1.0813 | 0.9127 | 1.3868 | 1.3702 |
| Nd3/Nd4 | 0.9364 | 0.9480 | 0.9138 | 0.9364 | 0.9364 |
| Vd4/Vd3 | 0.4465 | 0.4702 | 0.4619 | 0.4465 | 0.4432 |
| |F4/F3| | 0.6342 | 0.7476 | 0.5598 | 0.8773 | 1.5749 |
| |F/F34| | 0.1949 | 0.0316 | 0.4154 | 0.3412 | 0.6999 |
| ΣCT/TTL | 0.5469 | 0.6245 | 0.5947 | 0.5969 | 0.5663 |
| TTL/F | 1.904 | 1.924 | 1.767 | 1.746 | 2.076 |
| F3/F | 0.8107 | 0.7606 | 0.7043 | 0.6796 | 0.6841 |
| TTL/H/FOV | 0.1097 | 0.1041 | 0.1006 | 0.1008 | 0.1100 |
| BFL/TL | 0.1170 | 0.0861 | 0.1453 | 0.1748 | 0.1127 |
| (FOV*F)/H | 59.7173 | 56.1107 | 59.0325 | 59.8770 | 54.9541 |
| T23/TTL | 0.0032 | 0.0033 | 0.0029 | 0.0034 | 0.0369 |
| F/H | 1.8546 | 1.7426 | 1.8333 | 1.8595 | 1.7066 |
| DSR3/T12 | 0.8228 | 0.7963 | 0.7291 | 0.6562 | 0.7151 |
| D/H/FOV | 0.030 | 0.032 | 0.031 | 0.030 | 0.030 |
| |F1/F| | 5.457 | 6.187 | 4.401 | 4.674 | 3.975 |
| |(R4 − R5)/(R4 + R5)| | 2.125 | 1.837 | 2.047 | 0.546 | 0.696 |
| dn/dm | 1.373 | 1.662 | 1.410 | 1.188 | 1.482 |
| |F1/F2| | 5.333 | 5.722 | 4.822 | 3.370 | 2.901 |
| |R1/R2| | 1.271 | 1.286 | 1.319 | 1.288 | 1.386 |
| |R9/R10| | 1.2519 | 0.9504 | 0.8504 | 0.6961 | 0.5441 |
| T12/TTL | 0.2624 | 0.2103 | 0.2031 | 0.1657 | 0.2260 |
| BFL/TTL | 0.105 | 0.079 | 0.127 | 0.149 | 0.101 |

TABLE 31-2-continued

| Conditional/Example | Example 6 | Example 7 | Example 8 | Example 9 | Example 10 |
|---|---|---|---|---|---|
| F4/F | −0.5142 | −0.5686 | −0.3943 | −0.5962 | −1.0773 |
| F5/F | −20.2565 | −3.6207 | 3.6941 | −15.8882 | −1.6700 |

TABLE 31-3

| Conditional/Example | Example 11 | Example 12 | Example 13 | Example 14 | Example 15 |
|---|---|---|---|---|---|
| SL | 21.1850 | 23.5155 | 21.1322 | 23.5580 | 22.1352 |
| TTL | 31.4664 | 29.8939 | 29.6851 | 29.8663 | 31.2105 |
| BFL | 3.9121 | 1.8877 | 3.2580 | 3.9241 | 3.1617 |
| TL | 27.5543 | 28.0061 | 26.4271 | 25.9422 | 28.0488 |
| D | 8.4696 | 9.8630 | 9.2312 | 9.3474 | 8.7294 |
| H | 9.5240 | 8.6200 | 9.6340 | 9.3640 | 9.1020 |
| FOV | 32.2000 | 32.2000 | 32.2000 | 32.2000 | 32.2000 |
| F1 | −87.4694 | −65.7210 | −80.5299 | −79.3334 | −58.2290 |
| F2 | 17.0111 | 14.5191 | 16.0521 | 22.5015 | 20.6561 |
| F | 16.7472 | 12.0010 | 17.7437 | 16.6941 | 16.1682 |
| F3 | 13.5054 | 11.3794 | 12.9254 | 11.7866 | 10.4106 |
| F4 | −8.6853 | −8.3073 | −7.0070 | −9.9930 | −16.9123 |
| F5 | −215.1048 | −58.0879 | 58.9817 | −141.9678 | −13.7491 |
| F34 | −95.2810 | 402.0180 | −40.2181 | 55.4841 | 21.1534 |
| ΣCT | 16.6830 | 19.6396 | 17.8113 | 18.5974 | 17.6264 |
| SL/TTL | 0.6733 | 0.7866 | 0.7119 | 0.7888 | 0.7092 |
| CT2/T12 | 0.4093 | 1.2675 | 0.4815 | 1.0825 | 0.4166 |
| F2/F | 1.0158 | 1.2098 | 0.9047 | 1.3479 | 1.2776 |
| Nd3/Nd4 | 0.9364 | 0.9480 | 0.9138 | 0.9364 | 0.9364 |
| Vd4/Vd3 | 0.4465 | 0.4702 | 0.4619 | 0.4465 | 0.4432 |
| |F4/F3| | 0.6431 | 0.7300 | 0.5421 | 0.8478 | 1.6245 |
| |F/F34| | 0.1758 | 0.0299 | 0.4412 | 0.3009 | 0.7643 |
| ΣCT/TTL | 0.5302 | 0.6570 | 0.6000 | 0.6227 | 0.5648 |
| TTL/F | 1.879 | 2.491 | 1.673 | 1.789 | 1.930 |
| F3/F | 0.8064 | 0.9482 | 0.7285 | 0.7060 | 0.6439 |
| TTL/H/FOV | 0.1026 | 0.1077 | 0.0957 | 0.0991 | 0.1065 |
| BFL/TL | 0.1420 | 0.0674 | 0.1233 | 0.1513 | 0.1127 |
| (FOV*F)/H | 56.6212 | 44.8297 | 59.3053 | 57.4060 | 57.1980 |
| T23/TTL | 0.0032 | 0.0033 | 0.0034 | 0.0033 | 0.0424 |
| F/H | 1.7584 | 1.3922 | 1.8418 | 1.7828 | 1.7763 |
| DSR3/T12 | 0.8228 | 0.4212 | 0.6975 | 0.6966 | 0.5807 |
| D/H/FOV | 0.028 | 0.036 | 0.030 | 0.031 | 0.030 |
| |F1/F| | 5.223 | 5.476 | 4.539 | 4.752 | 3.601 |
| |(R4 − R5)/(R4 + R5)| | 2.236 | 2.807 | 1.932 | 0.608 | 0.689 |
| dn/dm | 1.349 | 1.867 | 1.671 | 1.326 | 1.652 |
| |F1/F2| | 5.142 | 4.527 | 5.017 | 3.526 | 2.819 |
| |R1/R2| | 1.277 | 1.372 | 1.320 | 1.282 | 1.393 |
| |R9/R10| | 1.4172 | 1.3056 | 1.3050 | 0.4090 | 1.7401 |
| T12/TTL | 0.2632 | 0.1632 | 0.2090 | 0.1471 | 0.2215 |
| BFL/TTL | 0.124 | 0.063 | 0.110 | 0.131 | 0.101 |
| F4/F | −0.5186 | −0.6922 | −0.3949 | −0.5986 | −1.0460 |
| F5/F | −12.8442 | −4.8403 | 3.3241 | −8.5041 | −0.8504 |

The present disclosure further provides an electronic device, which may include the optical lens assembly according to the above-mentioned embodiments of the present disclosure. The electronic device may be an independent electronic device such as a distance detection camera, or may be an imaging module integrated on, for example, a distance detection device.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, comprising: a first lens, a second lens, a third lens, a fourth lens and a fifth lens, which are arranged sequentially from an object side to an image side of the optical lens assembly along an optical axis, wherein, the first lens has refractive power, an object-side surface of the first lens is convex, and an image-side surface of the first lens is concave;

the second lens has positive refractive power, the third lens has positive refractive power, and an object-side surface of the third lens is convex;

the fourth lens has negative refractive power, and an image-side surface of the fourth lens is concave;

the fifth lens has refractive power; and a total effective focal length F of the optical lens assembly and an image height H corresponding to a maximum field-of-view of the optical lens assembly satisfy: F/H≥1.25.

2. The optical lens assembly according to claim 1, wherein a total length TTL of the optical lens assembly and a total effective focal length F of the optical lens assembly satisfy: TTL/F≤4.5.

3. The optical lens assembly according to claim 1, wherein a total length TTL of the optical lens assembly, a maximum field-of-view FOV of the optical lens assembly, and an image height H corresponding to the maximum field-of-view of the optical lens assembly satisfy: TTL/H/FOV≤0.30, and a unit of the FOV is degree.

4. The optical lens assembly according to claim 1, wherein the optical lens assembly satisfies one of:

$BFL/TL \geq 0.05$; or $0.02 \leq BFL/TTL \leq 0.27$, where BFL is a distance from an image-side surface of the fifth lens to an imaging plane of the optical lens assembly, TL is a distance from an object-side surface of the first lens to an image-side surface of the fifth lens, and TTL is a total optical length of the optical lens assembly.

5. The optical lens assembly according to claim 1, wherein a maximum field-of-view FOV of the optical lens assembly, a total effective focal length F of the optical lens assembly and an image height H corresponding to the maximum field-of-view of the optical lens assembly satisfy: (FOV*F)/H≤70, and a unit of the FOV is degree.

6. The optical lens assembly according to claim 1, wherein a total effective focal length F of the optical lens assembly, a combined focal length F34 of the third lens and the fourth lens, an effective focal length F1 of the first lens and an image height H corresponding to a maximum field-of-view of the optical lens assembly satisfy: |F34/F|≥1.4288, |F1/F|≥3.9297 or F/H≥1.3922.

7. The optical lens assembly according to claim 1, wherein a maximum field-of-view FOV of the optical lens assembly, a maximum effective aperture diameter D of an object-side surface of the first lens corresponding to the maximum field-of-view of the optical lens assembly and an image height H corresponding to the maximum field-of-view of the optical lens assembly satisfy: D/H/FOV≤0.06, and a unit of the FOV is degree.

8. The optical lens assembly according to claim 1, wherein the optical lens assembly satisfies one of:

the fifth lens is aspheric, $0.3 \leq |R1/R2| \leq 2$, or $0.2 \leq |R9/R10| \leq 2.5$, where R1 is a radius of curvature of an object-side surface of the first lens, R2 is a radius of curvature of an image-side surface of the first lens, R9 is a radius of curvature of an object-side surface of the fifth lens, and R10 is a radius of curvature of an image-side surface of the fifth lens.

9. The optical lens assembly according to claim 1, wherein the optical lens assembly satisfies one of:

$0.08 \leq T12/TTL \leq 0.5$; or $T23/TTL \leq 0.07$, where T12 is a distance along the optical axis from an image-side surface of the first lens to an object-side surface of the second lens, T23 is a distance along the optical axis from an image-side surface of the second lens to the object-side surface of the third lens, and TTL is a total length of the optical lens assembly.

10. The optical lens assembly according to claim 1, wherein a center thickness CT2 of the second lens along the optical axis and a distance T12 along the optical axis from an image-side surface of the first lens to an object-side surface of the second lens satisfy: CT2/T12≤1.5.

11. The optical lens assembly according to claim 1, further comprising a stop disposed between the first lens and the second lens, and wherein a distance DSR3 along the optical axis from the stop to an object-side surface of the second lens and a distance T12 along the optical axis from an image-side surface of the first lens to an object-side surface of the second lens satisfy: DSR3/T12≥0.37.

12. The optical lens assembly according to claim 1, wherein the optical lens assembly satisfies one of:

$|F1/F| \geq 1.7$; or $0.35 \leq F2/F \leq 1.75$, where F1 is an effective focal length of the first lens, F2 is an effective focal length of the second lens, and F is a total effective focal length of the optical lens assembly.

13. The optical lens assembly according to claim 1, wherein an effective focal length F1 of the first lens and an effective focal length F2 of the second lens satisfy:

$|F1/F2| \geq 1.8$.

14. The optical lens assembly according to claim 1, wherein the optical lens assembly satisfies one of:

$0.6 \leq SL/TTL \leq 1.24$, or $\Sigma CT/TTL \leq 0.75$, where SL is a distance from an object-side surface of the second lens to an imaging plane of the optical lens assembly, TTL is a total length of the optical lens assembly, and ΣCT is a sum of the center thicknesses of the first to the fifth lenses in the optical lens assembly along the optical axis.

15. The optical lens assembly according to claim 1, wherein a center thickness dn of the n-th lens with the largest center thickness among the second lens to the fifth lens and a center thickness dm of the m-th lens with the smallest center thickness among the second lens to the fifth lens satisfy: dn/dm≤2.85, where both n and m are selected from 2, 3, 4, and 5.

16. The optical lens assembly according to claim 1, wherein a radius of curvature R4 of an object-side surface of the second lens and a radius of curvature R5 of an image-side surface of the second lens satisfy: |(R4−R5)/(R4+R5)|≤10.

17. The optical lens assembly according to claim 1, wherein an effective focal length F4 of the fourth lens and an effective focal length F3 of the third lens satisfy: |F4/F3|≤2.5.

18. The optical lens assembly according to claim 1, wherein a total effective focal length F of the optical lens assembly and a combined focal length F34 of the third lens and the fourth lens satisfy: |F34/F|≥0.50.

19. The optical lens assembly according to claim 1, wherein the optical lens assembly satisfies one of:

$0.2 \leq |F3/F4| \leq 2.5$, or $0.1 \leq F3/F \leq 1.3$, where F3 is an effective focal length of the third lens, F4 is an effective focal length of the fourth lens, and F is a total effective focal length of the optical lens assembly.

20. An optical lens assembly, comprising: a first lens, a second lens, a third lens, a fourth lens and a fifth lens, which are arranged sequentially from an object side to an image side of the optical lens assembly along an optical axis, wherein, the first lens has refractive power, an object-side surface of the first lens is convex, and an image-side surface of the first lens is concave;

the second lens has positive refractive power;

the third lens has positive refractive power;

the fourth lens has negative refractive power;

the fifth lens has refractive power;

a maximum field-of-view FOV of the optical lens assembly, a maximum effective aperture diameter D of an object-side surface of the first lens corresponding to the maximum field-of-view of the optical lens assembly and an image height H corresponding to the maximum field-of-view of the optical lens assembly satisfy: D/H/FOV≤0.06, and a unit of the FOV is degree; and a total effective focal length F of the optical lens assembly and an image height H corresponding to a maximum field-of-view of the optical lens assembly satisfy: F/H≥1.25.

* * * * *